US005481084A

United States Patent [19]

Patrick et al.

[11] Patent Number: 5,481,084
[45] Date of Patent: * Jan. 2, 1996

[54] METHOD FOR TREATING A SURFACE SUCH AS A METAL SURFACE AND PRODUCING PRODUCTS EMBODYING SUCH INCLUDING LITHOPLATE

[75] Inventors: Edward P. Patrick, Murrysville; A. Victor Pajerski, New Kensington, both of Pa.

[73] Assignee: Aluminum Company of America, Pittsburgh, Pa.

[ * ] Notice: The portion of the term of this patent subsequent to Oct. 31, 2012, has been disclaimed.

[21] Appl. No.: 134,165

[22] Filed: Oct. 8, 1993

Related U.S. Application Data

[60] Continuation-in-part of Ser. No. 3,094, Jan. 11, 1993, which is a division of Ser. No. 670,576, Mar. 18, 1991, Pat. No. 5,187,046.

[51] Int. Cl.$^{6}$ .......... B23K 9/04
[52] U.S. Cl. .......... 219/123; 148/222; 219/137 R
[58] Field of Search .......... 219/68, 69.1, 69.11, 219/123, 125.12, 137 R; 148/222, 224, 524, 526, 565, 566; 427/455, 534

[56] References Cited

U.S. PATENT DOCUMENTS

| | | | |
|---|---|---|---|
| 2,125,172 | 7/1938 | Kinzel | 219/123 |
| 2,756,311 | 7/1956 | Persson et al. | 219/123 |
| 3,248,514 | 4/1966 | Ramsey | 219/123 |
| 3,679,418 | 7/1972 | Stroszynski | 427/455 |
| 3,902,976 | 3/1975 | Walls | 430/278 |
| 3,924,092 | 12/1975 | Lessmann et al. | 219/123 |
| 4,021,592 | 5/1977 | Fromson | 430/278 |
| 4,147,425 | 4/1979 | Friedman et al. | 219/69.11 |
| 4,211,619 | 7/1980 | Usbeck | 430/278 |
| 4,301,229 | 11/1981 | Sakaki et al. | 430/278 |
| 4,324,841 | 4/1982 | Huang | 430/278 |
| 4,452,674 | 6/1984 | Gillich et al. | 430/278 |
| 4,476,006 | 10/1984 | Ohba et al. | 430/278 |
| 4,524,125 | 6/1985 | Huang | 430/278 |
| 4,555,475 | 11/1985 | Gamson et al. | 430/278 |
| 4,578,342 | 3/1986 | Sekiya | 430/278 |
| 4,633,054 | 12/1986 | Patrick et al. | 219/118 |
| 4,833,065 | 5/1989 | Nakanishi et al. | 430/278 |
| 4,902,353 | 2/1990 | Rooy et al. | 148/2 |
| 4,970,116 | 11/1990 | Kimura et al. | 430/278 |
| 5,012,062 | 4/1991 | Banks | 219/69.11 |
| 5,061,591 | 10/1991 | Nakanishi et al. | 430/278 |
| 5,073,475 | 12/1991 | Lauke et al. | 430/278 |

*Primary Examiner*—Clifford C. Shaw
*Attorney, Agent, or Firm*—Carl R. Lippert

[57] ABSTRACT

Substantial surface areas can be treated by continuously magnetically moving an electric arc around a general loop direction such as a circle, ellipse or oval and moving the surface so that the arc treats a substantial surface area. The arc treatment can be used to clean or increase surface area, or both, and a reactant or treatment agent can be brought to the arc contact site to alter the surface treated with the arc. Auxiliary treatments for the surface can precede or follow the arc treatment, or both. The invention produces very desirable surface properties including a mild roughness or matte condition suitable even for critical applications such as aluminum lithoplate. Other surface characteristics can include one or more of: capillarity, adhesion, emissivity, stable oxide, paintability, and others. Applications and advantages are believed to include lithoplate, hydrophilic heat exchanger finstock, capacitor foil, can sheet, venetian blind stock, adhesive bonded laminates and other bonded structural materials or structures, welding rod, aluminum brazing sheet, interrogatable strips for optical control instruments, enhanced, high current contacts, improved, controlled or differential friction characteristics for forming and shaping, automotive and other sheet, hot roll bonding, galvanizing and zinc coating of steel, texturing mill rolls, pretreatment for thermal spray treatments, organic coating adhesion, improved paint hiding performance, prosthetics, biohost or catalyst support and others. The process is applicable to aluminum, steel and other metals and other materials capable of carrying current sufficiently to maintain an electric arc.

108 Claims, 5 Drawing Sheets

METHOD FOR TREATING A SURFACE SUCH AS A METAL SURFACE AND PRODUCING PRODUCTS EMBODYING SUCH INCLUDING LITHOPLATE

This application is a continuation-in-part of application Ser. No. 003,094, filed Jan. 11, 1993, still pending, which is a division of application Ser. No. 07/670,576, now U.S. Pat. No. 5,187,046, filed Mar. 18, 1991, both of which are fully incorporated by reference herein.

BACKGROUND OF THE INVENTION

Rolled aluminum alloy in the form of sheet (unless otherwise indicated, sheet as referred to herein includes "foil") is a favored material for making lithographic plate ("lithoplate"), because of its cost effectiveness. But the lithoplate must be properly grained. By "lithoplate", we refer to the aluminum support material before it is coated with a photosensitive "resist". "Cost effectiveness" refers to the number of prints of acceptable quality which can be made with a single resist-coated lithoplate before it must be replaced. "Graining" refers to the roughening of a surface of the aluminum sheet. Graining the aluminum sheet is the first step towards providing photoresist-coated sheet with the requisite hydrophobic and hydrophilic characteristics which generate image and non-image areas. Though an aluminum alloy is used, commercial lithoplate of aluminum alloy is referred to as "aluminum" sheet or foil, for brevity, partially because nearly pure aluminum, such as 1050 alloy (99.5% pure) is a preferred material for electrochemically etched lithoplate, and partially because pure aluminum is known to be an impractical material for lithoplate.

To provide the hydrophobic and hydrophilic characteristics, a grained aluminum sheet is uniformly coated with a photosensitive "resist" composition which is exposed to actinic radiation beamed onto the resist through an overlay which corresponds to the image to be printed. Areas which are comparatively more soluble following irradiation must be capable of being easily removed from the support, by a developing operation, to generate the hydrophilic non-image areas without leaving a residue. The support which has been laid bare must be strongly hydrophilic during the lithographic printing operation, and be able to exert an adequately repelling effect with respect to the greasy printing ink.

The cost of producing lithoplate includes the cost of producing foil of an appropriately affordable alloy, the foil having a highly uniform microstructure, such as that obtained with electrochemical etching. The conventional wisdom has been: the more uniform the microstructure of controllably grained foil, the better suited the grained foil for use as lithoplate.

In addition to 1050 alloy, other widely used alloys are 3003, 1100 and 5XXX, the latter being specifically produced for the production of lithoplate, as disclosed in U.S. Pat. No. 4,902,353 to Rooy et al (class 148/subclass 2) the disclosure of which is incorporated by reference thereto as if fully set forth herein. Though the cost of such alloys themselves is not high relative to the value of the printed material generated with photoresist-coated lithoplate made therefrom, lithoplate is nevertheless deemed costly, and the ongoing challenge is to produce more cost-effective lithoplate.

The cost of lithoplate is ascribed in large part to the cost of graining aluminum sheet so that it is free from imperfections and will provide adequate resolution of the print to be made, as well as many hundreds, if not thousands of prints, before one must change the lithoplate in a printing press. Such imperfection-free graining, at present, is preferably accomplished by choice of an alloy which is particularly well adapted to chemical etching which is closely controlled by a bath composition, and the narrowly defined process conditions of its use. Together these result in the highly uniform graining, found by dint of experimentation under actual printing conditions, to be cost effective. Not only is the optimum aluminum alloy expensive, but so also is the necessary close control for chemical etching, and formulating and maintaining a chemical bath. Disposing of exhausted bath compositions further adds to the expense.

Such considerations militate towards finding a non-chemical solution to the problem of graining an aluminum sheet or foil for lithoplate. But non-chemical graining, that is, mechanical graining, is generally accepted as being too non-uniform, not only because it is relatively coarse compared to electrochemical etching, but also because it is difficult to control. The ongoing search is for a solution to the problem of providing controllably grained lithoplate without using an electrochemical process.

We have surprisingly found such a solution, except that it produces a highly non-uniform microstructure compared with that produced by electrochemical graining. It is believed that one skilled in the art of graining foil for use as lithoplate, upon viewing a photomicrograph of the non-uniform microstructure we produce on foil, simply would consider its use for lithoplate to be surprising.

In a resistance welding method disclosed in U.S. Pat. No. 4,633,054 (class 219/subclass 118), the disclosure of which is incorporated by reference thereto as if fully set forth herein, we prepared the surface of aluminum sheet for resistance welding. Such preparation involved several procedures, each of which was primarily directed to removing the surface oxide on a workpiece to be welded.

One of these procedures involved "arc cleaning" the surface of the workpiece with an electric arc, the intense heat of which contorted the planar configuration of the sheet. This arc cleaning, also referred to as "cathodic cleaning", resulted in roughening the contorted surface of the sheet in such a manner that the roughened surface was coarse and non-uniform, characterized by a high density of peaks rather than long ridges. Such arc cleaning is effected under conditions of electric current and traversal rate (the rate at which the arc traverses the sheet), which to a large extent overlap the conditions used for arc graining; except that, not all arc-cleaned sheet is suitable for being converted to lithoplate, but all uncoated arc-grained sheet is suitable for resistance welding.

All arc-grained aluminum sheet has a characteristic surface morphology, referred to as an "arc-grained morphology", characterized by a profusion of craters peripherally surrounded by delicate petal-like protrusions or projections. The craters range from about 1μ (micron)to about 10μ in diameter, typically in the range from about 2μ to about 5μ in diam. A substantial proportion, from about 30% to about 80%, or more of the protrusions, terminate in peaks or crenelations which, together with the craters, imbue such a surface, when coated with a phosphate-free protective coating, with a unique capillary action, namely the ability to have a capillary uptake of both water and printing ink.

These uncoated peaks were mechanically unstable and easily compressed when contacted with the electrode used to make the resistance weld (see '054 patent, col. 3, lines 45–50). For the specific purpose of resistance welding, the effectiveness of such arc cleaning of the surface of aluminum stock to be resistance welded was predicated upon the peaks being so high as to be easily compressible by mechanical pressure exerted by the welding electrode. The peculiarly delicate nature of the uncoated arc-cleaned surface improved the electrical contact between the electrode and the sheet, and resulted in the lowest interface resistance of the treatments evaluated, allowing effective resistance welding. Neither the coarseness nor the random undulations of the contorted surface were of much, if any, import as long as the interface resistance was sufficiently low. The object was to resistance weld one sheet to another adequately resistance-free aluminum surface. Sheets to be resistance welded are clamped to one another so that the random undulations in either surface are flattened out. Undulations in foil make it unusable as lithoplate.

Though such an arc-cleaned surface was just right for a workpiece to be resistance welded, an unstable delicate surface, with high peaks and correspondingly deep valleys, was microstructured so differently from the rugged, highly uniform, imperfection-free, fine-grained surface conceptualized as being the ideal lithoplate surface, it was to be expected that the arc-cleaned surface was deemed a most unlikely candidate for consideration in a lithoplate application. For one thing, even after being coated with a durable phosphate-free coating, a delicate surface will be quickly destroyed in normal use on a lithographic printing press. High mechanical stability is a well-established prerequisite for the supporting surface of lithoplate. For another, unless the configuration of anodized peaks and valleys, as well as the density or number of peaks, were both fortuitously matched to the required capillary uptake of conventional printing inks used in a printing press in the image areas, and of water in the non-image areas, there was no reason seriously to consider using an arc-cleaned aluminum surface for lithoplate, or modifying it to render it usable as lithoplate.

Nevertheless we did consider using an arc-cleaned aluminum sheet, and discovered we could modify the coarsely-grained surface by coating it, successfully enough to produce cost-effective lithoplate of remarkably high quality, and obtain a "run life" which exceeded our most optimistic expectations.

SUMMARY OF THE INVENTION

It has been discovered that an essentially flat arc-grained surface of a sheet of aluminum alloy ("aluminum" sheet or foil) can be produced with a coarse and non-uniform microstructure which, after it is coated with a durable phosphate-free coating, provides excellent lithoplate.

It is therefore a general object of this invention to provide non-uniformly arc-grained (relative to the desirable uniform microstructure of an electrochemically etched lithoplate), essentially flat, lithoplate which is peculiarly well-adapted to provide lithoplate. The "grained" supporting surface is photosensitized to provide photoresist-coated lithoplate for offset printing.

It is also a general object of this invention to provide lithoplate in a process in which one step comprises "arc graining" a thin, essentially flat aluminum sheet while removing enough heat to maintain its essentially flat configuration by contact with an adequate heat sink, to produce a non-uniform microstructure characterized by roughness ranging from about 0.1μ to about 1.5μ and a profusion of delicate peaks packed closely enough to provide a capillary uptake of water and printing ink in separately identifiable zones; and, in a subsequent step, coating the peaks substantially uniformly with a thin, durable, phosphate-free coating which stabilizes the peaks without adversely affecting the capillary uptake of water and ink by the coated peaks.

It has also been discovered that thin, essentially flat aluminum sheet in the range from about 5 mils but less than about 30 mils thick, can be "rastered" with a plasma-generating electric arc to grain (hence "arc-grain") the surface; such rastering effects localized melting of the surface on a micron level, yet maintains the essentially flat configuration of the sheet, and produces a non-uniform microstructure which may be coated with a phosphate-free protective coating. This coated microstructure is provided with the required capillary action when the arc-grained sheet is boehmited, nitrided or anodized; when further coated with a photoresist, the result is long-lived, high quality lithoplate.

It is therefore a general object of this invention to provide a method of producing lithoplate by: (1) controlledly rastering an A-C or D-C reverse polarity plasma-generating electric arc on an aluminum sheet less than 30 mils thick, which sheet is removably mounted on a heat sink such as a cylindrical drum, to provide the sheet with an essentially flat, arc-grained surface having a non-uniform but desirable microstructure; then (2) coating the arc-grained surface with a hard and durable, inert phosphate-free coating while maintaining a capillary microstructure in said surface adapted to provide a support for a photoresist for use in lithographic printing of adequate resolution.

It is a specific object of this invention to provide a lithoplate having an arc-grained microstructure which, though coarse and non-uniform relative to an electrochemically etched aluminum surface, when coated with a phosphate-free coating, is unexpectedly well adapted for use as a support for a resist, because our process avoids the inherent lack of control associated with mechanical graining; and, our process dispenses with the use of chemical baths which do not have to be maintained, and do not have to be disposed of.

It is another specific object of this invention to allow the use of a wide variety of inexpensive, high-strength aluminum alloys, in which the major constituent is aluminum, for use as lithoplate by providing a process for arc graining a thin essentially flat sheet of such an aluminum alloy and coating the flat sheet with a thin, durable, anodized, nitrided or boehmited coating in the range from about 0.1μ to about 2μ thick, so that it becomes a highly desirable support for a photosensitive layer of organic material.

It is yet another general object of this invention to produce lithoplate comprising arc graining aluminum foil with a plasma-generating electric arc traversed in a manner across the surface of the foil so as to provide a non-uniform cratered surface with peripheral petal-like protrusions, generated when the foil is maintained below a temperature at which its essentially flat configuration is converted to an undulating one.

It is still another specific object of this invention to provide a process for using, as lithoplate, an essentially flat arc-grained aluminum foil typically from about 5 to 25 or 30 mils thick, from about 10 cm to about 2 meters wide, and of arbitrary length, having a surface characterized by an arc-grained morphology coated with a phosphate-free protective coating. Because the process is a non-chemical one, it is prey neither to the problems of controlling the quality of chemicals nor to those of disposing of waste chemicals responsibly. Electromechanical arc graining permits the use of virtually any aluminum alloy ranging from miscellaneous scrap, including used beverage containers ("UBC"s) and structural aluminum scrap, to essentially unalloyed aluminum. The latter permits the use of very thin sheet, about 5 mils, which nevertheless provides excellent strength and extended operating life at a saving in the cost of metal.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Lithoplate for off-set printing is provided at least on one side, typically only on one side, with a radiation-sensitive layer of an organic composition which is light-sensitive. This layer permits the copying or reproduction of a printing image by a photomechanical process. Upon formation of the printing image, the grained supporting material on which the layer is deposited carries the printing image areas, and simultaneously forms, in the areas which are free from an image, the hydrophilic image-background for the lithographic printing operation.

The grained supporting surface, laid bare in the non-image area, must be so hydrophilic that it exerts a powerful repulsion of greasy printing ink. The photosensitive layer must adhere strongly to the grained aluminum support, both before and after exposure. It is therefore essential that the grained support be highly stable, both mechanically, from an abrasion standpoint, as well as chemically, particularly relative to alkaline media.

In a preferred embodiment, the foregoing are effected by arc graining a mill-rolled flat aluminum sheet which is about 10 to 20 mils thick and from 1 ft to about 5 ft wide or even wider. The basic process for arc graining is similar to that of arc cleaning disclosed in an article titled "Arc Cleaning Approach for Resistance Welding Aluminum", by Ashton and Rager in Welding Journal, September 1976. The process was further refined by O'Brien and Titus in an article titled "Arc Cleaning for Joining Aluminum" SAE 830524, March 1983. We now have adapted and refined the process for the specific, though unrelated, purpose of providing an arc-grained microstructure to support a resist.

Figure 1:
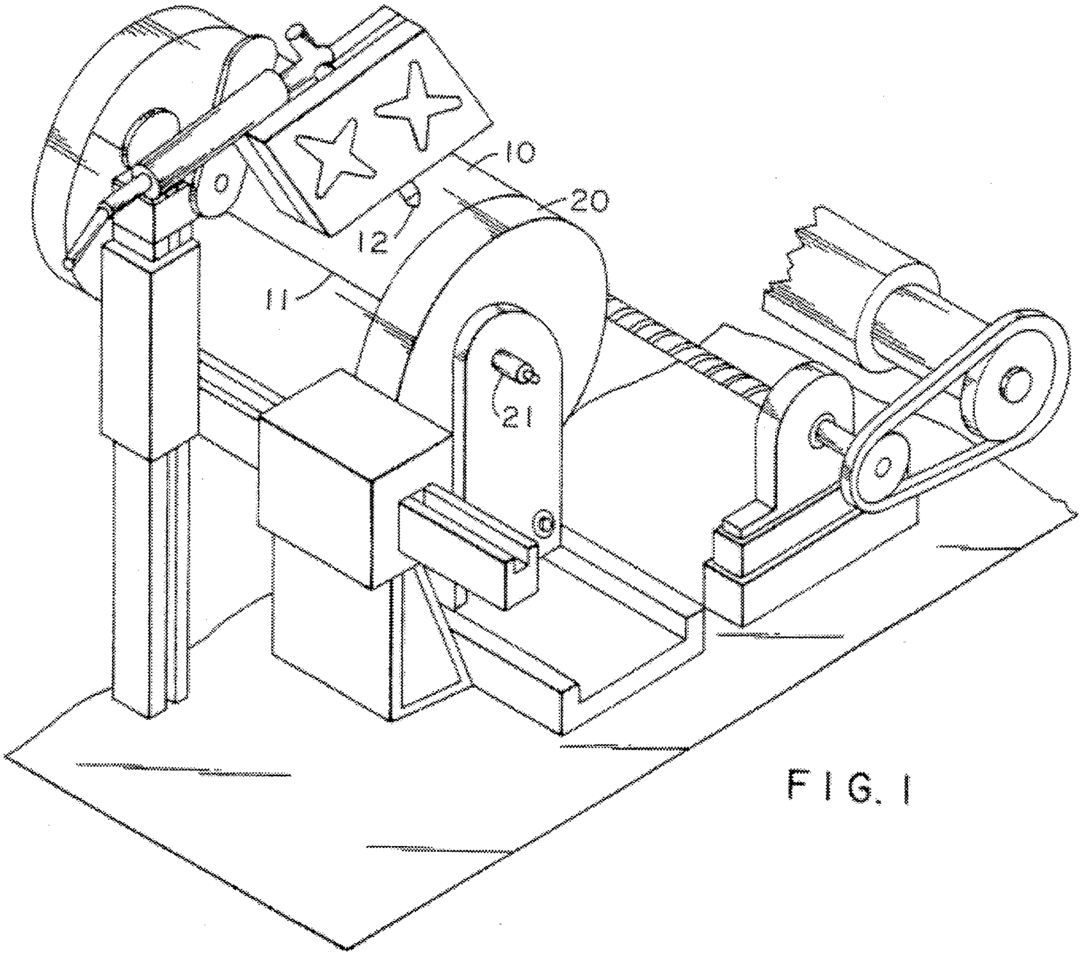
FIG. 1 is a perspective view schematically illustrating an air-cooled metal drum on which a thin, essentially flat aluminum sheet to be arc grained, is mounted; a plasma-generating electric arc is generated by passing sufficient current through an electrode which is rastered across the drum's surface as it is simultaneously rotated, and translated with a to and fro motion.

Referring to FIG. 1, there is shown an aluminum sheet 10 clamped at its longitudinal edges in a horizontal slot 11 so that the sheet lies snugly upon the circumferential surface of a drum 20 functioning as a heat sink means which is rotated on a shaft 21. The rotating drum is translated laterally, to and fro, to place one side edge, and then the other, of the aluminum sheet in plasma-generating relationship with an electrode means 12, such as a tungsten electrode. This to and fro action is produced by driving the rotating drum along a helically grooved shaft as shown, the longitudinal axis of the grooved shaft being parallel to the longitudinal axis of the shaft 21 on which the drum 20 rotates. The carriage for the drive 20 can be engaged with a an internally grooved follower (not shown) which rides back and forth on the helical grooved shaft. The grooved shaft can be powered by a hand crank or a reversible motor. Other means for oscillating the drum, for example a chain drive with terminal microswitches to return the drum to its terminal positions, may also be used.

Figure 6:
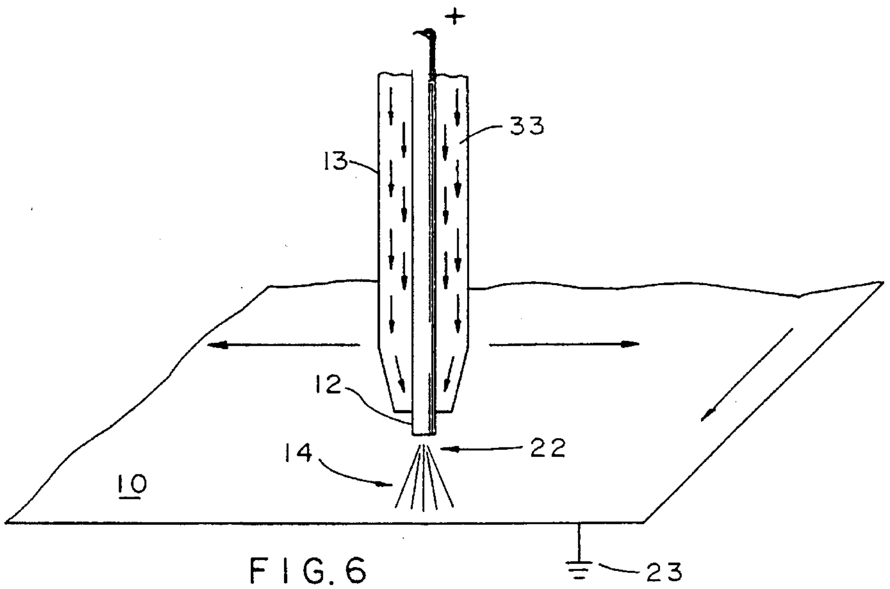
FIG. 6 is a detailed elevational view schematically illustrating the plasma-generating relationship of the electrode and the grounded aluminum sheet to be grained.

Referring to FIG. 6, the electrode 12 is held within a gas feed tube 13 and the flow of gas is controlled by a valve (not shown). The gas feed tube can be held in some clamping means as generally illustrated in FIG. 1. An electric arc 14 is conducted between electrode 12 and aluminum sheet 10.

One alternative is to mount the electrode on a carriage which is translatable in a raster motion, back and forth across the aluminum sheet, from one edge to the other. It is not critical whether the electrode is oscillated, or whether the rotating drum is oscillated, as long as the relative motion of the electrode and the mounted aluminum sheet is such as to provide the rastering motion desired.

In FIG. 1, the sheet can be grounded and the electrode can be positive (see also FIG. 6). The speed of rotation of the drum may be varied to vary the microstructure produced by the electrode in a shielding zone 22 containing electric arc 14 (FIG. 6) and the tip of the electrode 12 is in plasma-generating relationship with the surface of the aluminum sheet 10. Meanwhile, an ionizable gas 33 which can be unreactive with either the electrode or the aluminum sheet can be flowed around the electrode (as illustrated with arrows) to shield it in the shielding zone (22 in FIG. 6) which lies in the vicinity of the tip of the electrode and above the aluminum sheet. This shielding zone may be enclosed by a shielding means (not shown) if desired. The flow of ionizable gas into the shielding zone is under sufficient pressure to ensure that it displaces atmospheric gases and effectively maintains a seal around the electrode.

As-rolled aluminum sheet has a typical surface roughness $R_a$ (average) of around 0.25 to 0.75μ (microns or micrometers, or 10 to 30 microinches) overlaid with an oxide film the thickness of which may vary widely. This roughness is evidenced by parallel grooves created by the contour of the roll in the rolling mill, during the rolling process which forms the sheet. The peaks are relatively low and the valleys between them are correspondingly, not deep.

In one example, sheet 10 was mounted on the drum's surface as shown in FIG. 1, and a GTAW welding torch, fed with helium or argon as the shielding gas, and operated in DC reverse polarity mode (electrode positive, sheet 10 negative) with superimposed continuous high frequency, was continuously rastered in a scanning pattern across the surface of the sheet at a linear velocity of about 6 to 19 mm/sec (15 to 45 ins/min). Each scan traverses the width of the sheet along the X-axis, and each subsequent scan traverses the sheet with a next-adjacent pattern which partially overlaps the pattern of the preceding scan. The extent to which the patterns overlap along the X-axis is preferably such that the microstructure generated in the overlapped area is approximately the same as that in the remaining portion of the scanning patterns where there is no overlap. The flow of ionizable gas is in the range from about 5 to 24, for instance 12 to 24 liters/min (10 to 50 $ft^3$/hr, for instance 25 to 50 $ft^3$/hr). The DC power density used is in the range from about 0.005 to about 0.1 kwh/$ft^2$, the amount used being determined by the chosen linear velocity of the raster, thickness of the sheet, and the condition of its surface.

Figure 2:
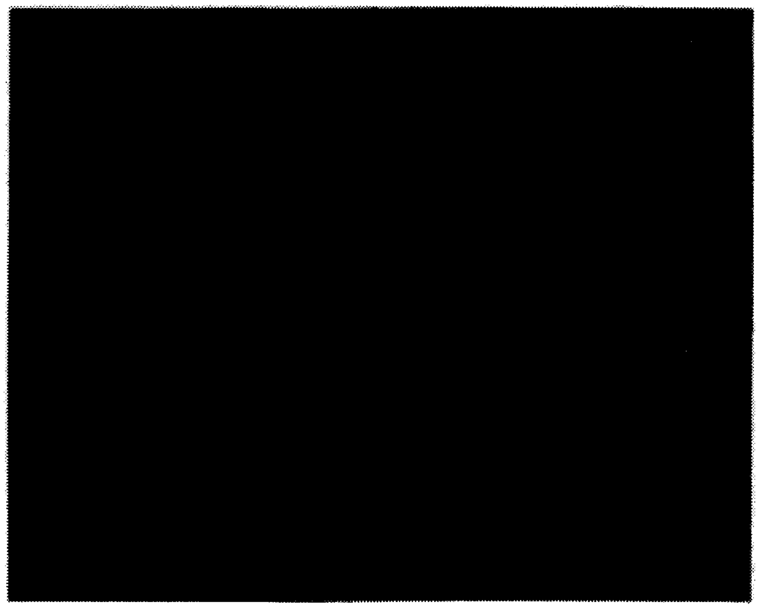
FIG. 2 is a photomicrograph of the surface of a thin (20 mils thick) aluminum sheet of 1050 alloy stock from a commercial shipment of roll stock, magnified 1000 times ("1000×X, for brevity) as it is received.
Figure 3:
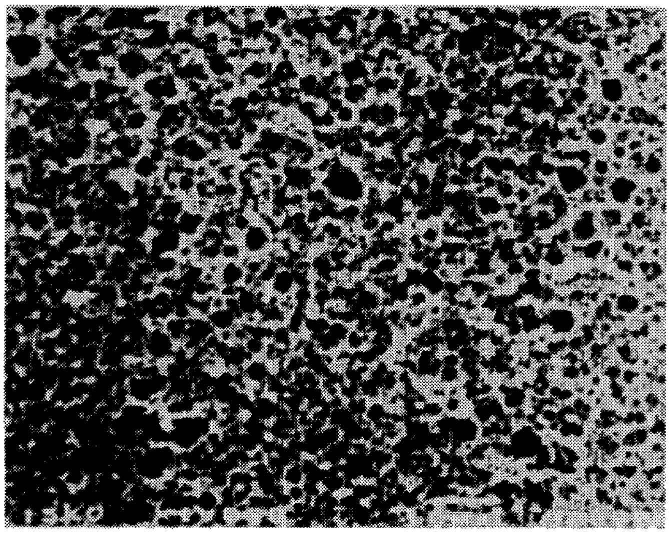
FIG. 3 is a photomicrograph of the surface of another thin sheet of the same 1050 alloy 1000×X, showing its highly uniform microstructure after it is electrochemically etched then anodized.

The result is that the surface of the sheet 10 is non-uniformly roughened in the range from about 0.75 to 1.5 micrometers (30 to 60 microinches). The photomicrograph (FIG. 3) shows the arc-grained surface of a sheet 0.012 inch thick, which surface was generated by the torch operated at 0.01 kwh/$ft^2$, a torch velocity of 10 mm/sec and a gas flow of 12 L/min. Photomicrograph of as-received sheet is seen in FIG. 2.

Figure 7:
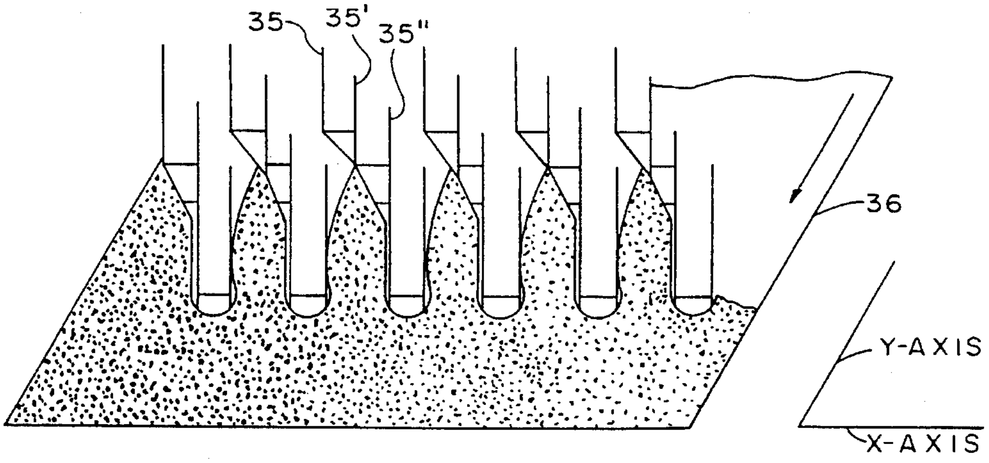
FIG. 7 is a perspective view schematically illustrating multiple stationary electrodes in plural rows, one behind the other relative to the direction of movement of an aluminum sheet to be grained. The sheet can be removably mounted on a cooled heat-conductive metal conveyor belt or on a roll.

In some cases, particularly where the width of the aluminum sheet to be grained is relatively wide, or the speed with which the sheet is to be rastered is unsatisfactorily slow, an electrode configuration illustrated in FIG. 7 may be used. There is illustrated an array of multiple electrodes 35, 35' and 35" in plural rows, each electrode with its own power supply (not shown). The electrodes 35 in the first row are linearly disposed in spaced apart relationship along the X-axis, as are the electrodes 35' and 35" in the second and third rows, respectively. The aluminum sheet 36 is linearly translated beneath the array of electrodes each of which is spaced in plasma-generating relationship with the sheet 36 which is preferably removably clamped or otherwise secured to a laminar, heat conductive conveyor belt or roll (not shown) which conveys the sheet in a direction along the X-axis.

The spacing of the electrodes 35 in the first row along the X-axis is such that the arc-grained pattern generated by each electrode is overlapped along the Y-axis by the patterns generated by the next-adjacent electrodes 35' and 35" in the second and third (X-axis) rows respectively.

Figure 8:
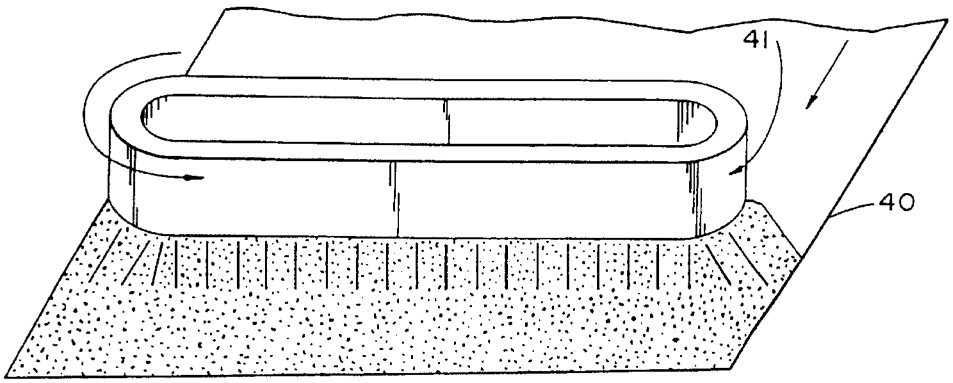
FIG. 8 is a perspective view schematically illustrating an elliptical or oval electrode which generates a magnetically impelled arc (MIA) over a portion of the transverse area of an aluminum sheet to be grained. As before, the sheet is removably mounted on a cooled metal conveyor belt.
Figure 9:
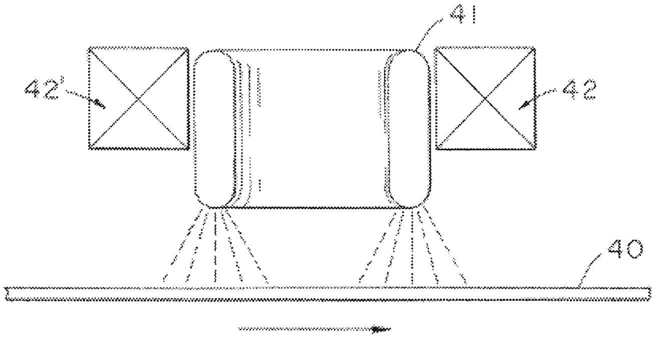
FIG. 9 is a side elevational view of the arc rotating coil shown in FIG. 8, illustrating the spatial relationship of the elliptical or oval electrode and the aluminum sheet to be grained, as the sheet is being laterally translated under the arc.

Referring to FIGS. 8 and 9, there is schematically illustrated a perspective and front elevational views, respectively, of another preferred embodiment for arc graining a sheet 40 using an elliptical or oval electrode 41 and magnetically impelled moving arc. As in the previous embodiment, the sheet 40 is preferably clamped to a heat conductive means such as a flat conveyor belt which is translatable in a direction along the X-axis. A conventional DC welding arc is drawn between the elliptical or oval electrode 41 and the face of the sheet 40, and the arc caused to be rapidly moved around the oval path of the electrode by applying a constant magnetic field. The magnetic field for arc movement is created by a suitably mounted arc rotating coil appearing in FIG. 9 as two cross sections 42 and 42'. The coil affects movement of the arc in a manner which is well known in the field of magnetically impelled arc welding, for instance as shown in U.S. Pat. No. 2,280,800; suitably configured permanent magnets of adequate strength may also be used.

The basic technique is applied to the task at hand by using appropriately constructed pneumatic cylinders, electro-pneumatic controls and an automatic adjustment of current to provide the desired arc. The arc current is supplied from a commercial DC welding power supply such as a Quasi-Arc Type MR375 which has a maximum current of 375A with drooping characteristic, controlled by a transductor. The open circuit voltage may be varied in the range from about 10 V to 60 V.

The carriage (not shown) for the elliptical electrode is moved into position, the magnetizing coil currents started, and the arc initiated and stabilized by superimposed high frequency. The position of the carriage is adjusted to a pre-set gap to maintain the arc continuously while the sheet is being translated beneath. The precise conditions for adjusting the magnetically impelled arc, the rate at which the sheet is translated, and other operating details are arrived at by trial and error such as one skilled in the art would expect to undertake to provide the precisely arc-grained surface desired.

From the foregoing descriptions it will now be evident that aluminum sheet having a large area may be arc grained essentially continuously, in a single pass, by using at least one, and alternatively, two or three elliptical electrodes, one after the other, to provide the desired arc-grained surface. However, where individual sheets are to be grained, an A-C or D-C reverse polarity plasma-generating electric arc rastered across the surface of a sheet mounted to cover the surface of a drum circumferentially, will be more than adequate.

However obtained, the arc-grained surface consists essentially of a multiplicity of closely spaced peaks which are to be chemically treated to provide the peaks with a durable coating. The manner in which this is done is not narrowly critical provided the treatment, whether boehmiting, nitriding or anodizing, leaves a capillary surface which provides a sharp demarcation between hydrophilic and hydrophobic areas after the treated sheet is coated with a photoresist and exposed to light.

Though the illustrative embodiment disclosed hereinabove used 1050 alloy in the best mode of the invention, the novel arc-grained lithoplate may be produced from a wide array of aluminum alloys including those which could not previously have been used for lithoplate if electrochemically etched or mechanically grained. Particularly useful aluminum alloys, in addition to 1050, are 1100, 3003, and 5XXX including 5005, and 5052.

The arc-grained surface may be boehmited by simply exposing the hot freshly arc-grained surface to a humid atmosphere, or to a fine water spray. A preferred thickness of the boehmite, a crystalline, non-porous gamma-alumina hydrate, is in the range from about 0.06μ to about 3μ, preferably from about 0.36μ to 1.8μ. Because the coating of boehmite is very thin, typically less than 1μ thick, the morphology of the arc-grained surface is preserved, yet the thin coating of boehmite is highly durable.

The freshly arc-grained surface may be also be electrochemically anodized to improve the abrasion and adhesion properties of the surface, as is known in the art, but it is essential that the anodized coating be relatively thick, particularly if the arc-grained surface is relatively coarse. The thicker anodized coating than that provided by boehmiting provides unexpectedly long-lived lithoplate. The relatively thick layer of oxide preferably in the range from about 1.21μ–3μ provides a density of oxide in the range from about 100–500 mg/sq ft., and any conventional method of anodizing the surface may be employed if it provides an anodized surface having the foregoing specifications.

Conventional electrolytes such as sulfuric acid, orthophosphoric acid, succinic acid, amidosulfonic acid, sulfosuccinic acid, sulfosalicylic acid or mixtures thereof, may be used for anodic oxidation. The direct current sulfuric acid process, in which anodic oxidation is carried out in an aqueous electrolyte which conventionally contains approximately 230 g of sulfuric acid per liter of solution, for about 1 to 10 min at about 10° C. to 20° C., and at a current density of about 0.5 to 2.5 Å/sq dm. In this process the sulfuric acid concentration in the aqueous electrolyte solution can also be reduced to about 8% to 10% by weight of sulfuric acid (about 100 g of sulfuric acid per liter), or it can be increased to about 30% by weight (365 g of sulfuric acid per liter), or more.

The "hard anodizing" process is carried out using an aqueous electrolyte containing 166 g of sulfuric per liter at an operating temperature of about 0° C. to 5° C., and at a current density of about 2 to 3 Å/sq dm for about 30 to 60 min at a voltage which increases from approximately 25 to 30 V at the beginning of the treatment, to approximately 40 to 100 V toward the end of the treatment. Direct current is preferably used for anodic oxidation but it is also possible to use alternating current, or a combination, for example DC with superimposed AC.

The freshly arc-grained surface may also be conventionally nitrided to provide a hard and durable surface with excellent post-exposure wettability. The density of the nitrided surface is preferably in the range from 5 mg/ft$^2$ to about 30 mg/ft$^2$, and a desirable thickness is in the range from about 10μ to about 500μ (micrometers).

The treated arc-grained aluminum sheet is coated with a radiation sensitive composition, usually by the manufacturer of sensitized printing plates. Any suitable photosensitive layer may be used which, after exposure, followed by development and/or fixing, yields a surface with the desired image which is to be printed. Typically such coated layers contain silver halides, but several others are used, as described in "Light Sensitive Systems" by J. Kosar, John Wiley & Sons, New York 1965. For example, colloid layers containing chromates and dichromates; layers containing unsaturated compounds, in which, upon exposure, the compounds are isomerized, rearranged, cyclized or crosslinked; layers which can be photopolymerized, in which upon being exposed, monomers or prepolymers are polymerized, optionally with the aid of an initiator; layers containing o-diazaquinones, or condensation products of diazonium salts; and still other layers which include electrophotographic layers, that is, those which contain an inorganic or organic photoconductor.

Figure 10:
FIG. 10 is a photomicrograph of the surface of another thin sheet of the same 1050 alloy at 100×, which lower magnification shows more clearly how non-uniform its microstructure is after it is arc cleaned in preparation for resistance welding.
Figure 11:
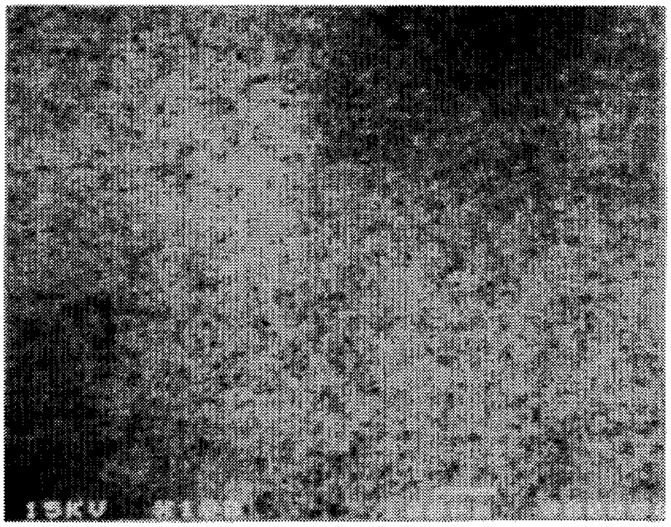
FIG. 11 is a photomicrograph of the surface of another sheet of 1050 alloy arc grained for lithoplate, at the same lower magnification, namely 100×, to show more clearly that, though also non-uniform, its microstructure is relatively more uniform than the arc-cleaned sheet prepared for resistance welding.

Now referring to FIG. 10, there is shown a photomicrograph of the typical surface of an arc-cleaned sheet under conditions of electric power consumption within the aforestated range for arc graining the sheet, but at the upper end thereof. A visual comparison indicates that it is substantially more non-uniform than the surface of the sheet of the same alloy which has been arc grained, shown in FIG. 11. The essential difference is that such arc-cleaned sheet which is eminently suitable for resistance welding is too non-uniform to provide the necessary capillary uptake of both water and printing ink, even after such an arc-cleaned surface is coated with an oxide rather than a phosphate coating.

Figure 4:
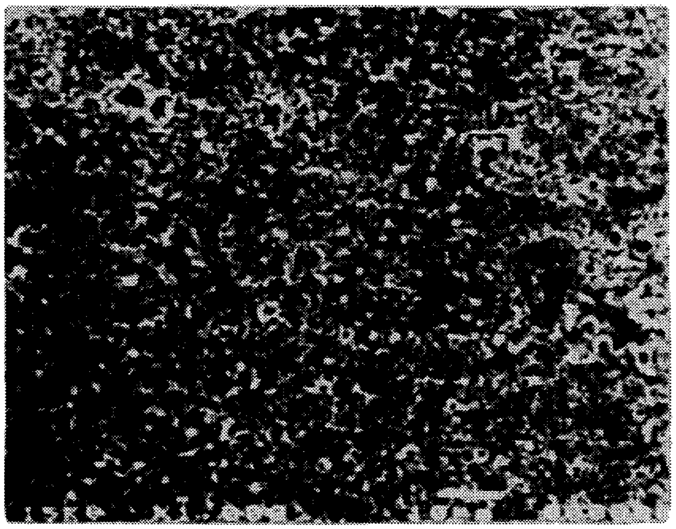
FIG. 4 is a photomicrograph of the surface of another thin sheet of the same 1050 alloy 1000×X, showing its non-uniform microstructure after it is arc grained.
Figure 5:
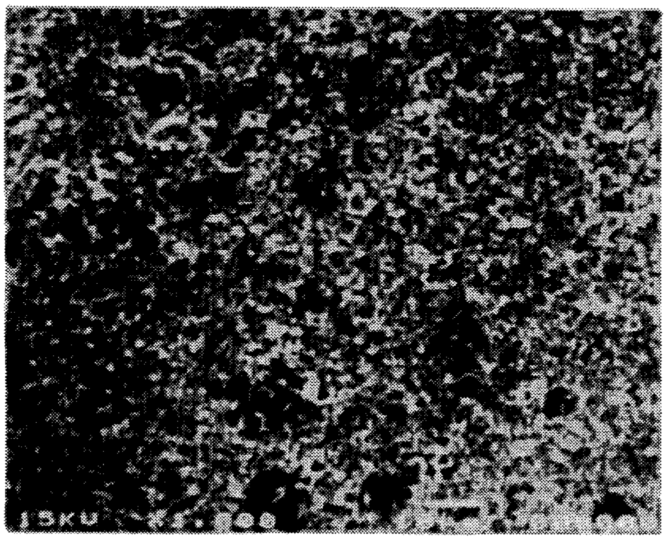
FIG. 5 is a photomicrograph of the surface of the same arc-grained aluminum sheet shown in FIG. 4, after it was conventionally anodized, shown magnified 1000×.

It will be appreciated that the coating provided on the arc-grained sheet is for the dual purpose of protecting the surface from chemical attack during use, and to provide it with desirable physical durability to ensure its longevity in use on a printing press. The thickness of this coating is so small that, in general, it does not make an appreciable visible difference to the roughness of the surface. This is evident in a comparison of the photomicrographs FIGS. 4 and 5. FIG. 4 shows the freshly arc-grained surface; and FIG. 5 shows an arc-grained surface after it is conventionally anodized.

The process has been described with a specific emphasis on making lithoplate which is a very significant application from the standpoint of difficulty in achieving a quality product. The practice of the invention has enabled the production of a true quality lithoplate surface despite the severity of the application. However, in a broader sense, the preceding makes it clear that the invention has various other applications as well, and it is to be understood that by manipulating or controlling various aspects of the system, various results can be achieved.

The invention has also been described with emphasis on treating essentially flat surfaces such as sheet or plate, but the invention is also considered useful for treating other kinds of surfaces. For instance, elongate rod or tube of round section can have its essentially elongate cylindrical outside surface treated by the invention by moving it through a ring-shaped electrode around which an arc impelling coil is positioned. Moving or impelling the arc around the outside of the rod and moving the rod through the electrode ring facilitates arc treatment of the entire outer surface of the rod. Similarly, the inside cylindrical surface of a tube, pipe or any inside cylindrical surface can be arc surface treated by moving it over a ring-like electrode inside which an arc moving or impelling coil is positioned.

Figure 12A:
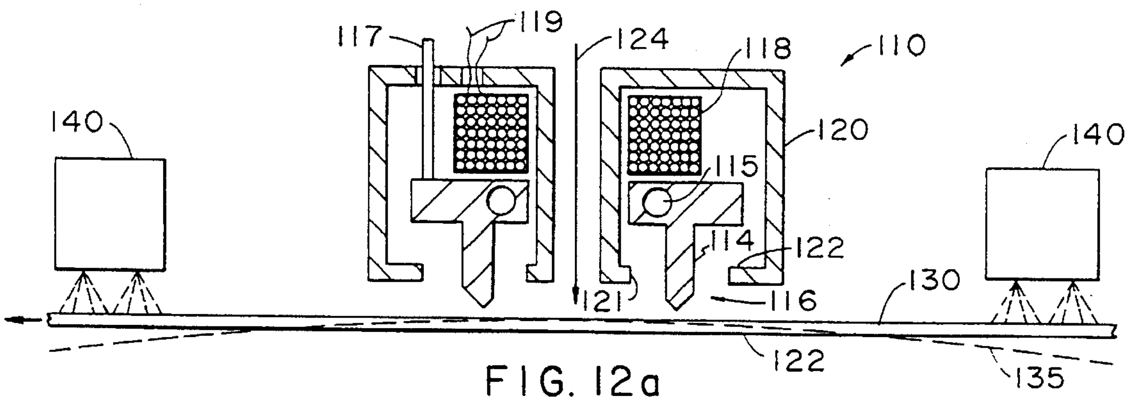
FIGS. 12*a* through 12*c* are detailed cross section elevation views showing embodiments of the invention for treating flat and round sections.
Figure 12B:
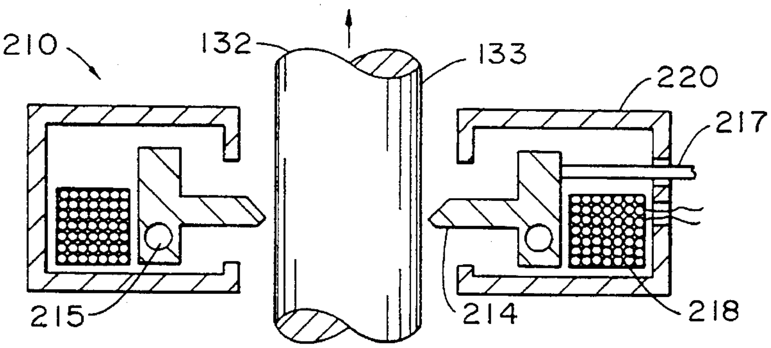
Figure 12C:
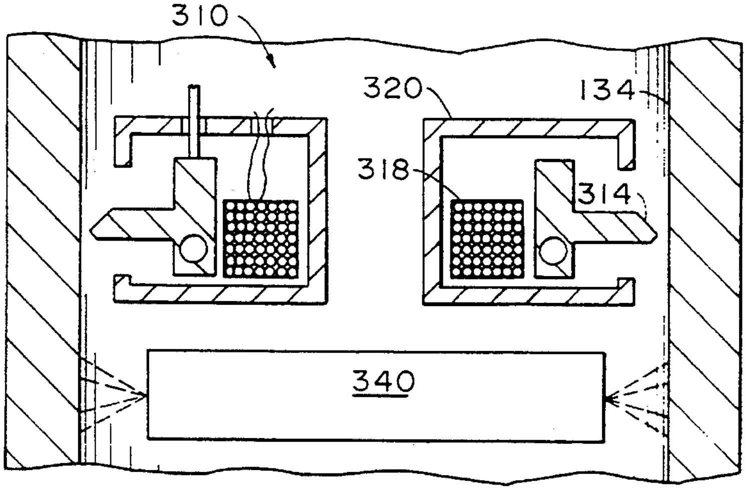

These effects, along with previously described arrangement for treating flat surfaces, are shown schematically in FIG. 12*a*, *b* and *c* wherein FIG. 12*a* shows an arrangement for treating a flat surface, FIG. 12*b* depicts a rod or tube around which invention electrode arrangement 210 is positioned and FIG. 12*c* depicts an inside surface such as a pipe or tube inside surface with the invention electrode arrangement inside the pipe or tube.

FIG. 12*a* shows an arrangement 110 for treating a substantially flat workpiece 130, the arrangement being the open oval type previously described in connection with FIGS. 8 and 9, FIG. 12*a* being a section across the straight parallel sides of the oval. In essence, FIG. 12*a* is a more detailed and elaborate version of the schematic generalized illustration of FIG. 9. The arrangement 110 includes electrode 114 including an internal coolant passage 115, the coolant connections for coolant supply being not shown. Wire winding 118 is above electrode 114, that is, to the opposite side of electrode 114 than workpiece 130. The wire winding 118 is shown as a bundle of small circles representing the cross section of wires winding in an oval path into and out of the plane of FIG. 12*a*, the entire area of the space designated 118 being occupied by the wire winding although only a portion of the space is shown as so occupied. The wires for winding 118 are typically generally of relatively small cross section, such as 18 gauge, are insulated and are closely packed.

Figure 12D:
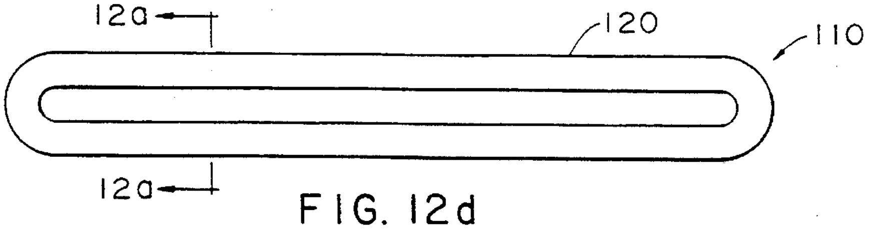
FIG. 12*d* is a plan view of the arrangement of FIG. 12*a*.

Iron core member 120 extends from one side of the electrode tip region 116 around the wire winding 118 and back to the other side of the electrode tip region to provide magnetic poles 121 and 122, one being "north" and the other being "south", specific pole location depending on the direction of current flow in wire winding 118. Thus, core member 120 in FIG. 12*a* is generally channel shaped with each side end of the channel being a magnetic pole. The channel section for core 120 shown in FIG. 12*a* when viewed from above has the oval shape described hereinbefore. This is illustrated in FIG. 12*d* which shows that FIG. 12*a* is a section across "a–a" in FIG. 12*d*. The electrode and magnetic impelling wire windings nest inside the channel as shown. Current leads for wire winding 118 are shown at 119 and the current leads for electrode are shown at 117, there being a plurality of electrode current leads 117 to help assure ample and consistent current around oval electrode 114. Holes are shown in core member 120 for the current leads 119 and 117. Gas, such as argon shielding gas or such other gas as may be desired, such as a treatment gas, can be supplied as indicated by arrow 124. Treatment gases are explained more hereinbelow. The space inside core member 120 that is shown as unoccupied in FIG. 12*a* is filled with insulation, not shown. The insulation should be selected to withstand high frequency (for example radio frequency) current if such current is used for starting or arc establishing, which is typically the case. In addition to, or in lieu of, coolant provided to electrode 114 through passage 115, coolant can be provided to the bottom side of workpiece 131, the side opposite that treated by the electrode 114, such as by placing a cooled drum or roller beneath the workpiece opposite arrangement 110. The workpiece, if flexible, can be wound or bent over the cooled roll or drum to increase heat transfer contact area and the drum can serve as the electrical contact for the workpiece.

The workpiece in FIG. 12*a* is shown moving from right to left and box 140 schematically represents an optional subsequent or preceding in-line treatment such as spraying on a metal or other coating (subsequent) or spraying on a treatment reactant preceding the invention process, the reactant on the surface reacting in association with the invention process. Such reactants and treatment agents are explained more hereinbelow. While the section shown in FIG. 12*a* is suited for an oblong or elongate, for example oval-shaped, electrode arrangement, it is also suited for a ring-like electrode arrangement in which the overall arrangement is rather donut-like in appearance. This smaller arrangement is suited for smaller jobs.

FIG. 12*b* shows the invention arrangement 210 for treating the outer surface of a rod, tube, pipe or wire workpiece 132. In the simplest application, the workpiece outer surface 133 is a cylinder but the cross section need not be round. It is believed that an elliptical, oval or other cross section, even possibly a more or less rectalinear cross section, can be treated although, at present, round cross sections for workpiece outer surface 133 are preferred for simplicity.

In FIG. 12*b*, core member 220 is donut-shaped when viewed from above rather than oval because workpiece 132 is round in cross section. The electrode 214 can be internally cooled as in FIG. 12*a* through passage 215 and workpiece 132 can be cooled, for instance internally, if it is a pipe. In general, the arrangement is similar to FIG. 12*a* except for reorientation for treating a cylindrical surface 133. Number 218 designates the magnetic impelling wire winding, the wires going round and round within the donut shape, number 218 showing the cross section such that the wires are shown in section. In operation, the arc is magnetically moved circumferentially around the outer cylinder surface and relative movement along the workpiece axis facilitates treating as much of the workpiece surface as desired. The arrangement of FIG. 12*b* could be reoriented 90° so that the workpiece moves horizontally instead of vertically.

In FIG. 12*c*, the invention system 310 is shown treating an inside cylindrical surface 134, the donut arrangement being much like FIG. 12*b* except that the electrode 314 is aimed outwardly of the channel-shaped core 320 rather than inwardly as shown in FIG. 12*b*. Round surfaces are preferred as easiest, but other configurations should be similarly treated, albeit less easily. The electrode 314 can be cooled internally and the workpiece can also be cooled. For instance, if the workpiece has an outer surface accessible to cooling, such as if it is a pipe, the outer surface can have coolant applied thereto. In operation, the arc is magnetically moved circumferentially around the inner cylinder surface and relative movement along the workpiece axis facilitates treating as much of the workpiece surface as desired. Box 340 represents an optional process or processes that can be applied before or after (or both) application of the invention process. For instance, the inside cylinder surface 134 can be the cylinder bore of an internal combustion engine which surface is treated with the invention process promptly followed by metal thermal spraying represented by box 340, which can move together in a single pass through the cylinder bore. The invention process can clean and roughen the surface 134 and thus enhance adhesion of the thermally sprayed coating. In treating very large cylindrical surfaces, for instance around a foot or two or more in diameter, it could be more practical to use the arrangement of FIG. 12*a* rather than FIG. 12*b* or *c*. For instance, in treating the cylindrical surface of a rolling mill roll, the roll could be positioned beneath the arrangement in FIG. 12*a* such as depicted by the arc of dotted line 135 and the roll rotated. If the roll length exceeds that of the arrangement 110, the arrangement 110 can be gradually moved along roll length as the roll rotates such that the treatment proceeds in a more or less spiral pattern on the cylindrical surface.

In FIGS. 12*b* and *c*, respectively, the surface treated is an outside cylindrical surface and an inside cylindrical surface. As stated above, the surface need not be a round cylinder and for square or other non-round surfaces, the expression inside lineal or outside lineal is used.

In FIG. 12 it can be seen that the electrode can be viewed as a somewhat elongate loop, circular in FIGS. 12*b* and 12*c* and an elongate oval in FIGS. 12*a* and 12*d*.

As previously indicated, in most of the preferred embodiments of the invention described herein, the electric arc is magnetically moved in a direction across a surface of a workpiece and relative movement is provided between the arc or arc generator along a direction transverse to the aforesaid direction so as to cover extensive portions of that surface. In the simple case of a relatively flat or rectangular surface, the arc can be moved repeatedly across the width (for instance back and forth repeatedly across the width) while the arc generator is moved along the length of the surface, or the surface is moved along its length while the arc generator is stationary.

In the case of a cylindrical surface, the arc is magnetically moved circumferentially across and around the cylindrical surface and the cylinder is moved along its length while the arc generator is stationary or vice versa.

It can be seen that the invention includes moving the electric arc magnetically across a surface and effecting relative movement between the surface and the arc generally transverse to the magnetic arc movement mechanically. That is, physically moving the arc generator or the workpiece (or both) while the arc is magnetically moved so as to cover substantial area.

It is to be understood that the workpiece can be a sheet that is to be textured or roughened, as in producing lithoplate, or the workpiece can just be cleaned or otherwise beneficiated by this system, or it can be a sturdier or heavier workpiece such as a large rolling mill roll or other thicker object such as a heavy metal casting, forging, extrusion, rod or plate, in fact, substantially any object with a treatable surface although sheet is one preferred workpiece. As used herein, sheet includes foil which, in the case of aluminum, is typically considered to be rolled material thinner than around 0.006 inch thick, and accordingly sheet includes any substantially flat product whether or not readily coilable or readily bendable, even by heavy equipment that is thinner than plate, that is, not thicker than about 0.25 or 0.3 inch. Metal sheet up to around 0.3 inch or 0.2 inch thick or preferably not over around 0.1 inch thick, for instance around 0.05 inch or less is quite suitable. The invention process can be quite successfully applied to aluminum sheet less than 0.02 inch and less than 0.01 inch thick, for instance around 0.004 or 0.005 inch thick. On the other hand, the invention is highly suited to much thicker metal, such as 0.2 inch or thicker, for instance one inch, or several inches thick. It is to be appreciated that the material of the workpiece may be any material capable of conducting sufficient electricity for the process to proceed, that is, capable of having a substantially stable electric arc applied to it. Thus, cermets, metal matrix composites, graphite, conductive plastics or polymers, intermetallic or partly metallic compounds such as tungsten carbide, can be employed provided that the object conducts electricity sufficiently for the process to proceed. The more conductive materials are metals which are one preferred workpiece, but as just stated, other materials may be employed as the workpiece or object on which the improved process is practiced.

The polarity of the system is a significant aspect that can be used to advantage in practicing the invention depending on the specific objective desired. As described above, where it is desired to impart a significant roughening effect and remove light or thin organic coatings or films, and where DC current is used, it is preferred that the electrode on the electric arc generator be the plus or positive electrical connection and that the workpiece be the negative connection. This arrangement which can be termed "reverse polarity" favors more roughening of the sheet, foil or other workpiece while generating less heat in the workpiece. Substantial heat, however, is generated in the positive electrode and some means to cool that electrode can be advisable in this mode of operation.

Where, however, it is desired to produce more heat in the workpiece and achieve less roughening, the DC polarity can be changed such that the electrode in the system is negative and the sheet or other workpiece is positive. This arrangement can be called "straight polarity" and produces more heat in the workpiece but reduced or even possibly no roughening of the workpiece. It does, however, generate a significant amount of heat in the workpiece and it is believed that this heating can be used where it is desired to heat the workpiece, even clear through the workpiece thickness, such as in an annealing or other thermal operation which can alter the internal structure and the properties of the material and thus thermally beneficiate the metal which can include anneal, heat treat or other desirable condition or internal structure effect. Straight polarity also can be used to remove light or thin organic or lubricant coatings or films with little or no apparent roughening.

The speed with which the arc is moved or travels across or along a surface can be important in practicing the invention process. Arc speed is increased by increasing the current in the magnetic impulsion coil winding which increases the magnetic flux to impel arc movement. Speed is reduced by lowering the coil current. In general, the faster the electric arc is moved along the surface, the less energy per unit area is transferred to the workpiece. Where the electrode is negative and the workpiece positive, much of this energy tends to heat the workpiece, as just explained, and moving the electrode rapidly can lessen the temperature rise in the workpiece, whereas moving the arc more slowly can increase the temperature rise in the workpiece. Arc current also exerts its own influence on both energy transfer and even speed. In general, the higher the arc current used, the higher the amount of energy or heat available to the workpiece and transferred to the workpiece. For instance, if the arc is moved very quickly along the surface at low arc current, the workpiece tends to be affected more superficially, whereas using a higher current, or moving the arc slower, or both, results in imparting more energy, which can be considered to be heat, per unit area to the sheet or other workpiece. In general, increasing the speed with which the arc travels across the sheet or workpiece, or the speed with which the workpiece is moved as an arc repeatedly traversing the sheet or other workpiece, or both, tends to reduce the amount of energy imparted per unit area to the workpiece surface, all other things being equal. However, increasing speed with a corresponding increase in current can permit the process to speed up and possibly maintain a given level of energy input per unit area of workpiece surface.

The arc gap can be around 0.09 inch and the voltage about 30 to 40 volts, but it is believed that substantially higher voltages such as 60 or 70 or 80 volts or more can be useful in practicing the invention. Higher voltage may permit a larger arc gap (electrode tip to workpiece distance) and spreading of the arc treated area such that the process can operate faster. The increased arc gap can make higher amperage levels preferred to keep the arc intensity at the workpiece at a desired level.

Referring to the open oval electrode arrangement of the invention, such as shown in FIG. 8 wherein the arc between the open oval electrode edge and the workpiece is moved along the lower edge of the oval electrode, the arc can be moved along the electrode at a speed of 400 or 500 feet per second or faster. The arc has been moved at 600 feet per second along the arc discharge open loop edge of the electrode so as to travel back and forth across the sheet being treated at about 600 feet per second. The sheet can be moved at about 20 or 25 feet per minute as it passes past the electrode. The current applied through the arc for this example would be about 600 amps for moving the sheet at 25 feet per minute and around 500 amps when moving the sheet at around 20 feet per minute, in each case the arc traveling at 600 feet per second across a 16-inch wide moving sheet. For a 60-inch wide sheet moving at about 60 feet per minute, a current of around 7000 amps would be used. These figures are intended to illustrate the practice of the invention, although it is significant that the arc can be rastered or moved at quite substantial speeds using magnetic impulsion as in FIG. 8. Arc movement speeds of 50 or over 100 feet per second are achieved and speeds of 100 to over 600 feet per second can be achieved. It is believed that arc movement speeds of up to 1000 feet per second and even faster, up to 2000 feet per second or even substantially faster, are believed achievable in practicing the invention. At these arc speeds, significant changes appear to occur in the arc to workpiece region. For instance, as discussed later, the inert gas cover can be eliminated without necessarily degrading the operation. This itself reduces costs.

Referring again to the open oval electrode arrangement such as that shown in FIG. 8 wherein the arc between the open oval electrode and the workpiece is moved along the lower edge of the open oval electrode (the edge closest to the workpiece), the speed with which the arc travels across or along a surface in an arrangement such as the open oval electrode can be increased by increasing the current in the arc impelling coil that generates the magnetic field that moves the arc along the oval electrode. There can be some limit as to the speed that can be attained at a given arc amperage, however, in that as the arc travel speed is increased, the arc tends to be led around the oval pass path such that the arc inclines with the electrode end of the arc leading and the workpiece end trailing which lengthens the arc such that the arc can become less stable than desired or possibly can be extinguished. However, increasing the arc current tends to alleviate this effect in that a higher current arc tends to be more stable and because the arc itself generates a field which is responsive to the magnetic impelling coil magnetic field in such a way as to increase the speed at which the arc travels.

Thus, it can be seen that arc current, length, speed (referring to either arc travel speed across a workpiece or the speed at which the workpiece travels beneath the arc, or both) or selection of positive or negative DC electrode (polarity) can have substantial influence on results achieved in using the present invention. In addition, cover gas selection and material being treated and even electrode material also can have an effect.

As is recognized in the art, solid state electronics can enable achieving controlled current patterns, and this can be useful in practicing the invention. For instance, some preferred embodiments of the invention utilize direct current (DC) arc, and it has already been explained how choice of polarity influences the results in that, in general, making a DC electrode negative tends to impart more heat into the workpiece and making a DC electrode positive tends to impart less heat into the workpiece. Using alternating current (AC) produces a heating effect between the DC different polarity extremes just mentioned and also produces roughening. In addition to these aspects, solid state electronic control can be used to generate or control an AC or DC current wave form in step up and down in cyclic fashion so as to enable a finer degree of arc control to achieve various results.

In starting the invention process, it is advantageous to establish a stable electric arc fairly rapidly. Superimposing a high frequency AC current on the principal current is a technique that is useful, as is temporarily reducing the distance between the electrode and workpiece. It is often preferred to use an inert gas to start the arc even if no inert or special gas is used once steady state operation is reached, for instance if air is used.

In various embodiments of the invention, it can be useful or advantageous to utilize inert shielding gas such as argon, helium or other inert gases, and mixtures thereof, especially at start-up when the arc is established and stabilized. However, the invention has been successfully practiced with no shielding gas or with air or oxygen or other gas that can be viewed as reactive. Eliminating the cost of the shielding gas and gas supply can result in significant cost savings. When the invention process is practiced on a metal surface such as aluminum using air rather than, or in addition to, an inert gas, the process can result in an oxidized surface which can be combined with the roughening effect described hereinbefore to produce a roughened and oxidized surface which can be an advantage when an enhanced surface is desired. It is believed that mixtures of argon with as much as 30 or 35% (by volume) hydrogen could possibly increase arc stability and possibly allow for more arc speed across the surface being treated. Significant amounts of hydrogen in the arc region could produce moisture which could result in a boehmite surface.

Thus, it is believed that the invention can utilize in the arc region active or reactive gases such as nitrogen, ammonia, organic nitrides or nitrates, diborane, boron halides, organic-boron compounds, hydrocarbons, oxygen or oxides, oxygen-containing hydrocarbons, hydrogen and combinations of reagents or reactive element or chemical constituents. Arc region gases can also contain volatile metal compounds such as metal halides, organo metal complexes, metal hydrides, carbonyls or other metal-bearing gases, and in fact, any of the reactant or agent combinations used in chemical vapor deposition can be employed in the invention process. The use of such gases in the invention process can enable altering a workpiece or workpiece surface such as by achieving a significant variety of surface conditions and properties including surface compositions produced by reactions between or among gases or between or among gases and the workpiece. Reaction or treatment constituents or agents can be added as gas, liquid or solid. Solids or possibly liquids can be added either by introduction into the electric arc region or by predisposition on the workpiece, which can be done by coating the workpiece. For instance, a solid agent can be suspended in particulate form in a liquid vehicle and applied to a sheet surface and the vehicle then dried, if desired, before the sheet enters the arc region. The important thing is that the reaction or treatment agents or constituents are brought together in the electric arc vicinity so as to capitalize on the intense energy of the arc to power or aid the reaction. Thus, the invention includes bringing into the arc region or vicinity, for instance, at or near where the arc contacts the workpiece, such reaction or treatment agents as just described, and treat or beneficiate the surface during or in association with the invention process. A simple example of this effect may be supplying oxygen or air in lieu of shielding gas or the use of no shielding gas at all (similar to supplying air in lieu of shielding gas) resulting in an oxidized surface which has a number of applications or potential applications. Another example may be nitriding by using nitrogen. It is believed that it may be possible to impart more complex surfaces such as silicon carbonitride or similar hard surfaces in using the invention. Also, metal oxides reducible by aluminum could be applied to an aluminum surface and the invention process used to reduce that oxide to a metallic coating.

The invention can be practiced in sequence to achieve a sequence of desired effects such as applying or utilizing one group of reaction or treatment agents in a first pass which is then followed by a second pass which can involve different or complimentary treatment or reaction agents. This can be done either by passing an entire workpiece, such as a roll of material, through a first treatment and then passing the same workpiece or roll through a second treatment or simply having the treatments disposed in sequence one behind the other as the workpiece, such as sheet, travels through the respective treatment sites in sequence. For instance, an open oval electrode of the type described earlier can be applied to produce a first treatment which is then followed by a second open oval electrode with different reaction constituents to impart a second treatment. By performing treatments or reactions on the surface of a workpiece such as aluminum, desirable properties such as higher hardness, lubricity, corrosion resistance, electrical properties such as oxide capacitor foil (roughened and oxidized to provide more surface and a dielectric layer), optical properties such as a matte finish to obtain a desired level of emissivity, or various desired properties may be imparted.

By referring to a treatment agent, such is intended to include an element or ingredient or compound capable of achieving a desired result in practicing the invention, such as forming a desired compound or material by action or reaction with another agent, or on or with the workpiece itself, or combinations of these effects. As already explained, agents for reaction or treatment can be already present on the workpiece by virtue of a coating (permanent or temporary) applied thereto, or by an element or compound in the workpiece itself, or by gases introduced to the arc site or by compounds introduced to the arc site, such as in the form of a rod or other introduction means, the main concern being to bring together the treatment reaction agents or the agents intended to combine in the vicinity of the arc so as to help facilitate the desired treatment or reaction or other result to alter or beneficiate the surface of the workpiece.

In addition to treatment in the arc region, the invention includes other treatments before or after the arc effect. For instance, in FIG. 12*a* a reactant or treatment agent can be applied to flat workpiece 130 (which can be metal sheet at 140 to the right of 110 in FIG. 12*a*). This can apply a coating or substance that can react in the arc region, if desired, or apply any desired substance before the arc contacts the workpiece 130 surface. Also a treatment material or agent can be applied after the workpiece 130 contacts the arc at 140 (to the left of 110 in FIG. 12*a*). For instance, water can be applied to workpiece 131 essentially right after it passes (moving right to left in FIG. 12*a*) through the arc treatment 110. A substance other than water can be applied in lieu thereof or in addition thereto, if desired.

As emphasized earlier, the invention process enables imparting a roughening or a texturing to the surface of a metal or other object. As explained, an extremely significant application is the production of lithoplate which has extremely high and precise quality requirements. The invention process achieves this successfully, which attests to the exactness and precision capable with the invention process. In addition, other materials can be roughened or textured, such as automotive body sheet, capacitor foil, appliance sheet, can stock, heat exchanger fin stock, tooling material, or any metal or other product for which a textured or roughened surface is desired. Workpieces other than sheet and other than metals can be beneficiated by the invention process as also previously explained. As already indicated, the roughening can be accompanied or followed by a reaction such as oxidizing or possibly boehmiting in practicing the invention process. Other subsequent processes can include chemical conversion treatments or coatings or any desired chemical or other treatment to alter the grained surface imparted by the practice of the invention. One application that it is believed can be benefitted by the invention process is that of rolling mill roll texturing. It is recognized in the metal rolling arts that textured rolls enable higher reductions by providing traction so as to avoid slippage that can otherwise occur when attempting higher rolling mill reductions. The reductions referred to are the extent to which the metal is squeezed or thinned out in a given roll pass. For instance, a rolling reduction of 50% reduces the thickness of the workpiece by half and produces a commensurate doubling of the length. Roll texturing also can provide small cavities to hold rolling lubricants which enhances the rolling process, as is known. Textured rolls can also be used to impart a texture or pattern on the rolled product surface. Different types of texturing can be used for different purposes. Roll texturing has involved mechanical or machining operations and, more recently, has utilized laser and other sophisticated and costly measures to achieve desired surface conditions. For instance, one sophisticated technique is electron discharge texturing (EDT) which is generally considered to be an important process for achieving a fine texture on rolls, albeit quite expensively. The invention process can impart a surface on order of magnitude finer than most EDT surfaces, for instance a 2 micron order of dimension (for example between ridges or depressions) as opposed to around 200 or more microns for EDT. Further, the rounded (rather than sharp or pointy) features of the invention texturing in comparison to an EDT surface are believed advantageous from the standpoint of generating less fines and debris in rolling. The practice of the invention process enables achieving a desirable textured surface on rolls at greatly reduced cost. As explained earlier, the texturing achieved by the invention process can be controlled and manipulated to alter the degree of roughness or texturing with a relatively fine degree of precision by controlling the speed at which the operation proceeds and the intensity and characteristic of the arc.

As already explained, proper control of DC polarity and other aspects can reduce or eliminate the texturing effect and utilize the invention process for surface beneficiation other than surface roughening. The invention process has successfully been used for cleaning thin metal sheet, within about 0.010 to 0.020 inch thickness, so as to permit the application of paint thereto without a chemical cleaning or etching operation. This is not to say that thicker sheet cannot be used. Thicker sheet such as 0.045 has been similarly treated although treating thinner sheet can be more sensitive. The process was applied two ways: (a) cleaning without roughening, and (b) cleaning plus roughening.

In the first operation referred to (cleaning without roughening), the thin aluminum sheet workpiece was the positive electrical connection and the electrode was the negative electrical connection, and the speed and DC arc current intensity was adjusted to apply arc energy rather superficially (relatively high speed and low current) so as to remove surface contaminants, mainly organic lubricant films, without substantially altering the internal structure of the metal which was cold rolled tempered and without seriously affecting the surface of the metal by roughening it. The paint in this case was clear paint and adhered well to the shiny aluminum substrate. Removal of organic films or lubricant films as just described can find application in flexible packaging metal (e.g. foil), can stock and other applications, such as aluminum or other sheet for vehicle or aerospace use. In fact, surface topography appeared to be pretty much retained after the treatment. The process could have been slowed down such as to heat up the metal throughout its thickness and alter its internal structure such as by annealing or recrystallizing the metal, but that was not done since it was desired in this case to retain the cold roll tempering of the metal being cleaned for painting.

In the second operation, straight polarity was used (electrode negative connection-workpiece positive). This cleaned and mildly roughened the thin aluminum workpiece. The roughening even further enhanced paint adhesion and the whiteness of the roughened surface enhanced paint color in that the white-like roughened surface could be readily colored with paint, even possibly less paint, than an etched surface.

The use of the invention for cleaning and roughening as just described can find use in sheet for automotive applications, among others.

In producing an extremely sensitive product, such as lithoplate, it is desired to achieve the general characteristics hereinbefore described for lithoplate. However, in a broader sense, the invention encompasses other less uniform textures such as those referred to earlier in connection with arc cleaning for welding. It is to be appreciated that certain embodiments of the invention, for instance, those using the open oval electrode of FIG. 8, are more concerned with extensive surface treatment rather than extremely localized surface roughening attendant to an operation such as spot welding. In general, some preferred embodiments apply the invention to large substantially flat (easily coilable or bendable, or not) surfaces of a workpiece such as coilable metal sheet wherein substantial contiguous areas such as fifty or a hundred square feet have a minor dimension not less than 2 or 3 or 4 or 5 or 6 inches wide. For instance, in practicing the invention, a coil of clad or unclad plate or sheet or foil of aluminum or an alloy thereof or other metal can have essentially the entire area of a surface treated. The surface referred to is a major surface as opposed to an edge, for instance, a sheet 2 feet wide by 300 feet long can have 500 or 600 substantially contiguous square feet treated. In fact, that is quite desired in producing lithoplate or surface textured capacitor foil, can stock, heat exchanger fin stock or other coilable or non-coilable metal or other products. In typical applications, extensive areas including more than 40% or 50% or 60% or 75% or 80% of an area of an entire coil of material such as metal, for instance 85% or 90% or 95% or more, for instance 99+% of the surface on one side, or of the surface on both sides, of the sheet in an entire metal coil can be treated in accordance with the invention process. Similarly, in cases other than coils of material, for instance a cylindrical surface or a flat plate surface or hot rolling stock such as an ingot surface, extensive treatment surfaces can refer to more than 40% or 50% or 60% or 75% or 80% or more of that surface, for instance 30% or more of a face of an ingot or a plate or 30% or 40% or more of a cylindrical or other surface.

As explained, the treatment can include roughening and the roughening can be similar to that previously disclosed in U.S. Pat. No. 4,633,054 or it can be somewhat different, such as explained hereinabove, or the process can involve little or no roughening and, instead, if desired, treat the metal deeper into the metal or other workpiece than just the surface. For instance, the invention process can be used to anneal or otherwise thermally treat an entire coil or other body of aluminum or other material, especially material of more or less constant thickness. Hence, the invention process can be used to treat or beneficiate any surface adapted to the process, for instance, that can have a more or less stable electric arc applied thereto, and the treatment encompasses a wide range of effects such as varying from a superficial cleaning to remove superficial contaminants, such as organic or lubricant films, to more substantial surface alteration, such as surface roughening, and still further to surface reaction effects, or combinations of any and all of these effects. The invention process can also be operated to quickly transfer heat into an object, especially and preferably a metal sheet, wherein a continuous annealing, heat treating or other thermal operation can be conducted without expensive vacuum equipment used in some other high speed heating approaches. Hence, in its broadest sense the term "treatment" as used herein encompasses both surface treatment and internal treatment of an object (for instance aluminum sheet) although surface treatment of aluminum or other metal sheet is presently believed to be an especially significant embodiment.

Some examples of applications or uses where the practice of the invention is considered useful and beneficial are now outlined.

Capacitor Foil: Capacitor foil is conventionally surface extended or roughened by electrochemical etching followed by anodizing to provide a dielectric film. The practice of the invention offers achieving a roughening or surface extension effect, together with an oxide coating which can be further enhanced by anodizing.

Catalysts and Catalyst Supports: Catalyst activity is often enhanced by use of surface extension, and catalyst supports are often surface extended so that catalysts can be applied thereto and the extended surface makes the catalyst itself more surface extended.

Bio-Host: The surface extension benefits of the invention can be employed as "bacteria houses" in that the "nooks and crannies" in the extended surface can provide sites for bacteria or other biological growth activities.

The aforesaid capacitor foil, catalysts and bio-host applications can simply involve the graining process of the invention applied to a relatively large sheet or foil which can be aluminum (which can subsequently be anodized) or possibly other metal. For instance, in the case of bio-host sheet, the metal could be stainless steel or titanium.

Prosthetics: The surface extended topography achievable with the invention can be applied to prosthetics to provide surface extension for tissue to grasp or latch onto.

Enhanced Adhesion: The surface roughening and surface modification achievable with the invention may be useful in enhancing adhesive bonding in that the surface extension or roughness on a metal surface can enhance the adhesion between an adhesive and a metal and the addition to adhesives of additives such as chelating agents can be used to enhance adhesive bond durability in that the joint achieved can be rendered more durable with use of chelating agents. Another aspect of enhanced adhesive bonding can include roughening or extending a surface of a metal surface in accordance with the invention which can be followed by a conversion coating, such as a chrome or chromate conversion coating or phosphorus, phosphate or organophosphate treatments, such as treating with polyphosphinic or polyphosphonic acid to impart a coating or surface modification.

An example of such adhesive bonding occurs in structural laminates comprising several layers of sheet of aluminum or other metal or material alternating with layers containing a bonding material or a matrix, such as an organic material, and reinforcing fibers such as fiberglass, graphite, boron, steel, aromatic polyamide, potassium titanate whiskers or the like. Aramide fibers are a good choice. The fibers can be continuous or discontinuous, with the former often being preferred. U.S. Pat. Nos. 4,500,589 and 4,489,123, fully incorporated herein by reference, describe certain structural laminates of the general type concerned. The adhesive can be thermoplastic, but thermohardening features in the adhesive layer can be preferred for thermal stability. The bond to the metal layers is very important and it is believed that the improved roughened or expanded surface achieved with the invention will enhance this important adhesive bonding application. Another example occurs in sheet such as aluminum alloy sheet intended for vehicle panels such as door, hood, trunk deck lids or other vehicle sheet members. Aluminum alloy sheet is seeing increasing use in vehicle applications, and Aluminum Association (AA) 2000 type alloys (copper as the principal alloying element), 5000 type alloys (magnesium as the principal alloying element) and 6000 type alloys (magnesium and silicon as principal alloying elements) are used for vehicular (or automotive) sheet. As is known, various vehicle double panel structures such as a door comprise an outer panel spaced from an inner panel, the outer regions of which are bent or shaped toward the outer panel and joined thereto. Joining techniques include hemming, spot welding and adhesive bonding, and combinations thereof. Such sheet is sometimes imparted with a conversion coating such as a chromate, phosphate or organophosphate coating and then coating with an adhesive (e.g. epoxy) compatible forming lubricant. Some example patent disclosures include U.S. Pat. Nos. 4,082,598, 4,784,921, 4,840,852 and 5,026,612, the entire contents of all these patents being fully incorporated herein by reference. Sheet for vehicle application includes automotive (including trucks and trailers of all sizes), boats, aircraft, hovercraft and other vehicles. Vehicle sheet treated in accordance with the invention and imparted with a roughened or textured surface offers advantages in adhesion to coatings (such as conversion coating) and to adhesives (such as epoxies) along with good spot welding characteristics. The non-directional roughness features of the surface textured in accordance with the invention offer better forming performance (shaping, consistency and other aspects) and spot welding, as well. All these features offer a much improved automotive sheet product.

The non-directional roughness features of the textured surface produced in accordance with the invention have numerous benefits including a more isotropic coefficient of friction (useful in sheet shaping operations such as drawing), improved spot welding and adhesive bonding.

Organic Coating Adhesion: As discussed above, paints, polymers and other organic materials such as adhesives can have adhesion quality enhanced by roughening or texturing the surface of metal or other material using the invention process. This can find possible application in a number of fields such as automotive body and fender panels or members, venetian blind stock, can end stock, can body stock, tab stock, TV dinner trays, etc.

In general, the improved surface produced by the invention practice can enable achieving a desired optical coating performance at lower coating weights (thickness).

Other Coating and Adhesion Applications: Metal or coatings other than organic coatings can also adhere better to a metal or other substrate if that substrate is first treated in accordance with the invention whereby the enhanced surface or surface roughness of the substrate facilitates superior adhesion. An example occurs in the zinc coating of steel or other ferrous sheet. Steel is pickled or treated with aggressive chemicals and then coated with zinc, such as by dipping in molten zinc. Substituting the invention process for some or all of the chemical treatment or pickling so as to pretreat the steel and roughen its surface in accordance with the invention not only is more environmentally friendly, but offers economic advantages as well. Another example is to arc grain an automotive or other sheet local area for repair, such as repair of a dent, wherein metal spray is applied to fill the depression or dent, and prior thereto the surface needs to be treated to accept the thermal spray and achieve the desired level of adhesion therewith. The roughening of the sheet in accordance with the invention in the dent or repair site enhances the adhesion of the thermal spray material. Still another thermal spray application occurs in automotive or other internal combustion engine blocks wherein a hard coating is applied by thermal spraying. Rather than mechanically roughening or abrading the engine block bores prior to thermal spraying, the thermal spray head device could carry a magnetically impelled arc ring to surface treat the cylinder bore in accordance with the invention substantially immediately ahead of the thermal spraying operation. In this case, the magnetic impelling coil is positioned slightly inside of the electrode and the arc travels radially outward from the ring-like electrode to the cylinder inside bore surface. This application is discussed more below in connection with FIG. 12(*c*).

Cathode Plate for Zinc Electrolysis: Production of zinc by electrowinning zinc from acidic zinc sulfate or possibly other solutions includes an aluminum cathode plate or "starting sheet" that can have a roughened surface. A patent disclosure relating to this process is Canadian Patent 1,046, 799, fully incorporated by reference herein. The roughening is often achieved by mechanical abrasion or brushing. Those surfaces can produce inconsistent results. Using the invention process to roughen the surface is considered to provide a superior cathode plate material.

Texturing Sheet: Textured mill rolls can be used to texture sheet as is known in the art. The practice of the invention can texture the sheet directly instead of using textured mill rolls for that purpose.

Textured Mill Rolls: Mill rolls can be textured as described earlier for any number of purposes, and the practice of the invention is considered useful to substitute for more expensive roll texturing operations. The invention practice can produce a surface with roughness features on the order of 2 microns as opposed to around 30 to 60 microns roughness features that can result from texture rolling.

Water Wettable Finstock: Finstock for certain applications such as condensers and other heat exchangers is rendered hydrophilic or liophilic by chemical or electrochemical etching or other surface altering procedures. The practice of the invention offers a less expensive and more environmentally friendly procedure for imparting hydrophilic or liophilic surfaces to metal finstock such as aluminum. Finstock is typically 0.003 to 0.006 inch in thickness and is stacked in layers or packs through which heat exchanger tubes are inserted or in some cases zigzagged back and forth between tubes housing liquid in making a heat exchanger, such as an air conditioner evaporator wherein the tubes can hold refrigerant and condensation would occur on the fin surfaces.

Hydrophilic fin surfaces are desired to prevent water or liquid from forming droplets that bridge across the space between adjacent fins causing pressure drop or resistance to air or gas flow. Finstock, as used herein, includes any material, commonly thin aluminum sheet, that is used to enhance heat transfer of a fluid passage such as a tube, pipe or other passage or channel. The sheet can be soldered or brazed to the fluid passage walls or simply placed against the walls so long as the finstock is in heat transfer relationship with the passage walls so that heat can move from wall to fin or vice versa. The practice of the invention can produce a high quality surface for finstock at improved efficiencies.

Rolling Lube Retention: As an alternate to texturing rolling mill rolls, sheet grained by the invention can have lubricant applied thereto and the surface roughening can carry lubrication into the roll bite.

Forming Lube Retention—Uniform Friction: Conventionally rolled sheet typically exhibits a longitudinal "roll grind" surface texture. When the sheet is used in forming operations, lubrication applied to the sheet can tend to flow into the elongate, generally parallel "valleys" of the roll grind surface texture on the sheet. The lubricant can then "stack up" forming a hydrodynamic lubricant pattern in the cross rolling (or transverse) direction causing an anisotropic coefficient of friction effect (different coefficient effect in transverse versus longitudinal direction). Sheet textured according to the invention can be imparted with a substantially isotropic surface texture to retain lubricant substantially uniformly and non-directionally so as to enhance sheet forming operations by reducing directional or anisotropic influences.

Differential Friction: Because the surface altering characteristics of the invention can be imparted so inexpensively, the invention may be useful in high volume operations, such as can making, wherein one side or area of sheet for making cans can be surface altered in accordance with the invention so as to provide differential friction characteristics which may be useful in making cans from metal sheet by drawing or drawing and ironing operations. Drawing and ironing operations are known in the art: to be useful in producing one-piece beverage or other cans useful for food, beverages or other materials. In the drawing operation, it may be helpful to have one side of the sheet for making the can grained in accordance with the invention and lubricated facing the female die and the as-rolled face facing the punch, the grained side having less friction in the drawing operation than the as-rolled side.

Electrical Contacts: Large area electrical contacts, such as permanently or semi-permanently closed contacts, can be enhanced by contact surface treatment in accordance with the invention which produces a roughened, but deformable surface such that when the contact surfaces are compressed, enhanced electrical contact is achieved. The surface also has a thin stable oxide that reduces the contact disruption. Intimate contact is achieved at many locations as opposed to occurring at fewer randomly located larger spots which results in uniform current distribution and overall lower joint resistance. This benefit can be significant in high current contact such as used in aluminum smelters wherein large aluminum conductors may be fastened together, and it is important to have current efficiency across the contact joint. The invention process can be applied to copper or aluminum or other contacts for this purpose. In general, the invention is considered more applicable to large contact area for large current loads by which is meant current loads of 100,000 amps per square foot or much higher, up to 500,000 or even 600,000 or 700,000 amps per square foot or more.

Roll Cladding: An aluminum structural alloy, such as an aerospace alloy, can be clad on one or both sides with a thin but more pure alloy for enhanced corrosion resistance. Aerospace alloys include Aluminum Association (AA) alloys containing copper as the major alloying element, typically along with one or more other elements such as Mg and Mn (2000 type) and alloys containing Zn as the major alloying element typically along with Mg and typically Cu and one or more ancillary elements such as Cr, Zr, Mn, V and/or Hf. Another cladding operation features a thin brazing alloy on a thicker core alloy. This cladding can be done by roll bonding at elevated temperature. The core or structural alloy, for instance in the case of aluminum alloys, can be provided as semi-continuously cast large ingot (for example, 50 inches or more wide by 12 inches or more thick by several feet long) or as continuously cast stock provided by casting between rotating rolls or moving belts. This is all referred to as ingot derived metal. The core material also could be provided as a rolled, forged, extruded or otherwise worked stock. The roll bonding operation is enhanced where the surfaces of the thick structural ingot or working stock or the surface of the cladding material, or both, are first treated in accordance with the invention. The improved surface texturing, it is believed, will eliminate or reduce blistering or other defects that can be encountered in roll cladding operations. In roll cladding, bonding between core and liner is achieved by stretching the oxide and obtaining aluminum-to-aluminum or metal-to-metal contact (bonding) at the breaks in oxide coatings. Hence, significant rolling reduction is required to achieve bonding. Also, discrete areas where such contact is not achieved results in blisters on unbonded areas. The uniform, high density of deformation surface features achieved in the invention texture afford deformation, attendant oxide breakup and nascent metal contact by applying normal force and can achieve bonding with significantly less rolling reduction, all of this with less potential of having local unbonded areas, i.e. blisters. The foregoing example mentions aluminum, but the process is believed applicable to other bonding operations as well, including bonding of different metals.

Plastic Deformation Joining: Similar to the case of roll cladding, other forms of plastic deformation bonding which operate by achieving direct metal-to-metal contact by plastic deformation which disrupts or displaces surface oxide. Cold pressure welding, flash welding and other similar processes are examples. The invention process produces a roughened or textured surface which, it is believed, can require less deformation to effect bonding.

Optical Temperature Measurement: Temperatures in rolling mills, for instance, the temperature of metal as it is being rolled, can be measured by optical instruments as an aide in mill control. As the metal is rolled and gets shiny, there is a lack of uniformity in optical characteristics of the aluminum surface and erratic or inconsistent optical temperature measurement can result. In rolling aluminum or other metal, an interrogatable strip near an edge of the metal being rolled can be imparted just ahead of the optical measuring device to provide an interrogatable strip for the optical equipment. The uniform emissivity of the largely non-directional surface texture in the interrogatable strip produced in accordance with the invention is believed will impart more uniform temperature measurement using optical instruments.

Laser Weldability: Aluminum can be difficult to laser weld because of its high reflectivity, i.e. low emissivity. To enhance energy couplings, higher emissivity coatings have been tried but they can be contaminants. The invention surface texturing can produce a high emissivity surface which would be non-contaminating, non-offensive and nonpolluting so as to facilitate better laser welding of an otherwise shiny surface. The improvement can apply to shiny or reflective surfaces other than aluminum wherein the laser weld site surfaces can be pretreated in accordance with the invention to improve the laser weld process.

Weld Wire or Rod: Treating weld wire, for instance aluminum weld wire, to roughen its outside surface produces improved welding because of the roughened surface having a thin, stable oxide coating. This enhances commutation (current transfer to the rod) and even can improve the welding integrity by enhancing wetting at the weldment outer reaches. The stable oxide film even can extend weld wire or rod shelf life, an important cost consideration.

It is to be appreciated that the invention process is widely applicable to a number of modifications and applications and it is intended in the claims appended hereto to embrace all such modifications and applications as may occur to those skilled in the art.

Unless indicated otherwise, the following definitions apply herein:

a. Percentages for a composition refer to % by weight for solids and by volume for liquids and gases.

b. The term "ingot-derived" means solidified from liquid metal by a known or subsequently developed casting process rather than through powder metallurgy techniques. This term shall include, but not be limited to, direct chill casting, electromagnetic casting, spray casting and any variations thereof.

c. In stating a numerical range or a numerical minimum or a maximum for any matter herein, and apart from and in addition to the customary rules for rounding off numbers, such is intended to specifically designate and disclose each number, including each fraction and/or decimal, (i) within and between the stated minimum and maximum for a range, or (ii) at and above a stated minimum, or (iii) at and below a stated maximum. (For example, a range of 1 to 10 discloses 1.1, 1.2 . . . 1.9, 2, 2.1, 2.2 . . . and so on, up to 10, and a range of 100 to 1000 discloses 101, 102 . . . and so on, up to 1000, including every number and fraction or decimal therewithin, and "up to 5" discloses 0.01 . . . 0.1 . . . 1 and so on up to 5.)

Having described the presently preferred embodiments, it is to be understood that the invention may be otherwise embodied within the scope of the appended claims.

What is claimed is:

1. A method of treating metal sheet for lithoplate application having a substantial surface to which a substantially stable electric arc can be applied comprising continuously moving an electric arc on said surface by magnetic impulsion around a loop periphery path established by a loop electrode, the loop of which is in arc passing relationship with said surface and effecting relative movement between one or more such electric arcs and said surface in such a manner as to contact a major portion of said surface and increase its surface area.

2. A method of treating an object having a substantial surface to which a substantially stable electric arc can be applied comprising continuously moving an electric arc on said surface by magnetic impulsion around a loop periphery path established by a loop electrode, the loop of which is in arc passing relationship with said surface and effecting relative movement between one or more such electric arcs and said surface in such a manner as to contact a major portion of said surface and increase its surface area.

3. The method according to claim 2 wherein said loop is substantially oval or elliptical.

4. The method according to claim 2 wherein said treatment heats at least a portion of said object sufficiently to affect its internal structure.

5. The method according to claim 2 wherein a reaction agent or treatment agent is brought into the arc site and reacted to alter said surface.

6. The method according to claim 2 wherein said object is a coilable strip or sheet.

7. The method according to claim 2 wherein said object is a rigid plate.

8. The method according to claim 2 wherein said object is a thick metal stock for hot rolling.

9. The method according to claim 3 wherein said object is a thick metal stock for hot rolling and wherein a cladding is bonded by hot roll bonding to the surface treated according to claim 2.

10. The method according to claim 2 wherein said surface is subsequently chemically treated.

11. The method according to claim 2 wherein the surface treated is negative and the electrode is positive.

12. The method according to claim 2 wherein the surface treated is positive and the electrode is negative.

13. The method according to claim 2 wherein said surface treated is at least 100 contiguous square feet having a minor dimension not less than 6 inches wide.

14. The method according to claim 2 wherein said surface treated is a contiguous area of at least 50 square feet, the minor dimension of which is not less than 6 inches.

15. The method of claim 2 wherein said loop is substantially circular.

16. The method of claim 2 wherein said relative movement is effected by moving said electrode in relation to said object so as to form a plurality of adjacent pass lines.

17. The method of claim 2 wherein said arc is directed along a substantially circular path.

18. The method of claim 2 wherein said electrode loop is substantially circular and a plurality of said circular loop electrodes are positioned across the width of a moving surface being treated, said moving surface moving in a direction substantially transverse to its width.

19. The method of claim 2 wherein an electrode loop is elongate oval or elliptical and its major axis traverses a substantial part of the width of said surface and said surface moves transverse to said elongate major axis of said oval or elliptical loop.

20. The method of claim 2 in which a plurality of such arcs are passed to said surface.

21. The method of claim 2 in which at least one permanent magnet is used in magnetically moving said arc.

22. The method of claim 2 in which at least one electromagnet is used in magnetically moving said arc.

23. The method of claim 2 in which said arc is directed along an oval or elliptical path.

24. The method of claim 2 which includes moving an electrode back and forth across a substantial portion of said surface as the arc travels around an oval or elliptical path so as to contact an extensive area of said surface with said arc.

25. The method of claim 2 which includes directing said arc in multiple passes across the same portion of the width of moving metal surface.

26. The method of claim 2 in which said surface comprises aluminum or aluminum alloy and said surface so treated is exposed to a media containing water to produce a surface containing boehmite.

27. The method of claim 2 in which said surface comprises aluminum or aluminum alloy and a portion of the surface so treated is anodized.

28. A method of increasing the surface area of a metallic surface using an electric arc, said method comprising:

(a) moving metal having a width and length in a first direction which is generally parallel to said length; and (b) continuously moving an electric arc on said surface by magnetic impulsion around an oval or elliptical loop periphery path established by an oval or elliptical loop electrode, the loop of which is in arc passing relationship with said surface, the loop extending across a substantial portion of the width of said metal, and effecting relative movement between one or more such electric arcs and said surface in such a manner as to contact a major portion of said surface.

29. A method of increasing the surface area of a metal surface comprising:

(a) moving a band of metal having said surface, said surface having a width and a length, in a direction parallel to its length; and (b) continuously moving an electric arc on said surface by magnetic impulsion around a loop periphery path established by a loop electrode, the loop of which is in arc passing relationship with said surface so as to contact an extensive area of said surface.

30. The method according to claim 29 for producing lithoplate.

31. A method of increasing the surface area of a metal surface comprising:

(a) moving a band of said metal having said surface, said surface having a width and a length, in a direction parallel to its length; and (b) conducting a plurality of electric arcs to said moving surface at least a plurality of such arcs being continuously moved on said surface by electromagnetic impulsion around loop periphery paths established by a plurality of loop electrodes, the loops of which are in arc passing relationship with said surface so as to contact an extensive area of said surface.

32. The method according to claim 31 for producing lithoplate.

33. The method according to claim 31 wherein a plurality of said loop electrodes are circular loops.

34. A method of increasing the surface area of a metal band surface comprising:

(a) moving a band of said metal having a width and a length in a direction parallel to its length; and (b) conducting a plurality of electric arcs to said moving metal band surface, a plurality of such arcs being continuously moved on said surface by electromagnetic impulsion around a plurality of oval or elliptical loop periphery paths established by oval or elliptical loop electrodes, the loops of which are in arc passing relationship with said surface, the loops extending across a substantial portion of the width of said metal so as to cause said arcs to contact an extensive area of said metal.

35. A method of increasing the surface area of the surface of aluminum metal using an electric arc, said method comprising:

(a) moving aluminum metal having a width and length in a first direction which is generally parallel to said length;

(b) conducting an electric arc between at least one loop electrode and a surface of said metal passing adjacent said electrode; and (c) magnetically moving said arc along at least one said loop electrode so as to contact a substantial portion of said width of said moving metal with said arc so as to contact an extensive area of said surface with said arc, said arc following a path generally defined by said loop shape of said electrode.

36. The method of claim 35 in which recitation (c) includes:

magnetically moving said arc across a substantial portion of said width of said metal so as to contact an extensive area of said metal.

37. The method of claim 35 in which recitation (c) includes:

using at least one permanent magnet to move said arc across a substantial portion of said width of said metal so as to contact an extensive area of said metal.

38. The method of claim 35 in which recitation (c) includes:

using at least one electromagnet to move said arc across a substantial portion of said width of said metal so as to contact an extensive area of said metal.

39. The method of increasing the surface area of a metal sheet or foil product comprising conducting one or more electric arcs to a major surface of said sheet or foil and effecting relative movement between said arc and said surface including continuously moving an electric arc on said surface by electromagnetic impulsion around a loop periphery path established by a loop electrode, the loop of which is in arc passing relationship with said surface in such a manner as to contact an extensive area of said surface.

40. The method according to claim 39 wherein a reaction agent or treatment agent is brought into the arc site and reacted to alter the surface.

41. A method of treating an object comprising conducting one or more electric arcs to a surface of said object including continuously moving an electric arc on said surface by magnetic impulsion around a loop periphery path established by a loop electrode, the loop of which is in arc passing relationship with said surface and effecting relative movement between one or more such electric arcs and said surface in such a manner as to contact a major portion of said surface and increase its surface area, and bringing a treatment agent into the arc site during arc contact with said surface to alter said surface.

42. The method according to claim 41 wherein a reaction agent or treatment agent is brought to the arc site as a fluid.

43. The method according to claim 41 wherein a reaction agent or treatment agent is brought to the arc site as a gas.

44. The method according to claim 41 wherein a reaction agent or treatment agent is brought to the arc site as a solid.

45. The method according to claim 41 wherein a reaction agent or treatment agent is present on the surface of said sheet prior to said treatment.

46. A method of treating a metallic surface of an object comprising continuously moving an electric arc on said surface by magnetic impulsion around a loop periphery path established by a loop electrode, the loop of which is in arc passing relationship with said surface and effecting relative movement between one or more such electric arcs and said surface in such a manner as to contact an extensive portion of said surface and increase its surface area.

47. The method according to claim 46 wherein said surface is a cylindrical surface and said arc is magnetically impelled generally circumferentially on said surface and substantially axial movement is provided between said arc and said cylindrical surface.

48. The method according to claim 47 wherein said arc is applied to an inside cylindrical surface.

49. The method according to claim 47 wherein said cylindrical surface is an outside cylindrical surface.

50. The method according to claim 46 wherein said surface is a planar surface.

51. The method according to claim 46 wherein said metallic object is coilable metal sheet.

52. The method according to claim 46 wherein said object is coilable aluminum or aluminum alloy sheet.

53. The method according to claim 46 wherein said object is ferrous sheet.

54. The method according to claim 46 wherein said object is aluminum or aluminum alloy sheet.

55. The method according to claim 46 wherein said object is ferrous sheet and said ferrous sheet is subsequently coated with material comprising zinc.

56. The method according to claim 46 wherein said object is thick plate.

57. The method according to claim 46 wherein said object is a metal ingot.

58. The method according to claim 46 wherein said surface is a metal surface that is then bonded to a second surface.

59. The method according to claim 46 wherein said surface is a metal surface that is bonded to another metal surface that has been treated according to claim 51.

60. The method according to claim 59 wherein said bonding is roll bonding.

61. The method according to claim 59 wherein the bonding is adhesive bonding.

62. The method according to claim 46 wherein said metallic object is container sheet for making into a formed or shaped container panel.

63. The method according to claim 46 wherein said metallic object is sheet for later forming or shaping into a vehicular member.

64. The method according to claim 63 wherein said sheet is provided with a conversion or other coating prior to being formed or shaped.

65. The method according to claim 63 wherein said sheet is shaped into a panel for a dual panel vehicular member and joined to another panel.

66. The method according to claim 65 wherein said sheet is first provided with a conversion or other coating before shaping.

67. The method according to claim 65 wherein said joining includes adhesive bonding or spot welding, or both.

68. The method according to claim 46 wherein said metallic object is appliance sheet that is made into an appliance panel.

69. The method according to claim 46 wherein said metallic object is venetian blind sheet that has a coating applied thereto.

70. The method according to claim 69 wherein said object is ferrous sheet and said ferrous sheet is subsequently coated with material comprising zinc.

71. The method according to claim 46 wherein said metallic object is sheet or foil for capacitors and wherein said increased surface is anodized.

72. The method according to claim 46 wherein said metal object is heat exchanger finstock sheet for incorporation into a heat exchanger having fins provided by said sheet.

73. The method according to claim 46 wherein said metallic object is a rolling mill roll and said surface is the rolling surface thereof.

74. The method according to claim 46 wherein said object is a sheet or plate layer for a structural laminate, said sheet or plate layer having at least one major surface thereof treated according to claim 46, said surface being spaced from another metal surface treated in accordance with claim 46, said surfaces being joined through an adhesive therebetween containing a reinforcing media in said laminate.

75. The method according to claim 74 wherein said structural laminate contains several of said metallic layers, at least some of said metallic layers being in aluminum or an alloy thereof.

76. The method according to claim 46 wherein said metal object is aluminum or aluminum alloy sheet that is made into a cathode in a zinc electrolysis cell.

77. The method according to claim 46 wherein said metallic object is steel sheet and wherein said surface treated according to claim 46 is coated with zinc by contact with molten media comprising zinc.

78. The method according to claim 46 wherein said metallic object is a metal sheet or plate wherein the method according to claim 46 is applied to a rolling surface thereof to provide an optically interrogatable matte surface band at or near the lateral edge of said rolling surface for optical rolling mill control instrumentation.

79. The method according to claim 46 wherein said arc is magnetically impelled at a speed of at least 50 feet per second.

80. The method according to claim 46 wherein said arc is magnetically impelled at a speed of at least 200 feet per second.

81. The method according to claim 46 wherein said arc is magnetically impelled at a speed of at least 400 feet per second.

82. The method according to claim 46 wherein said arc is magnetically impelled at a speed of at least 600 feet per second.

83. The method according to claim 46 wherein said arc is magnetically impelled at a speed of at least 1000 feet per second.

84. The method according to claim 46 wherein said arc is magnetically impelled at a speed of at least 2000 feet per second.

85. The method according to claim 46 wherein said arc is a d.c. arc with said electrode being the positive connection and said metallic object being connected to ground.

86. The method according to claim 46 wherein said arc is an alternating current arc.

87. The method according to claim 46 wherein an inert gas is provided at the arc site.

88. The method according to claim 46 wherein the arc site is not deliberately provided with gas from a site external to the arc site.

89. The method according to claim 46 wherein said arc is conducted in the presence of an atmosphere containing air.

90. The method according to claim 46 wherein said arc is conducted in the presence of an atmosphere containing oxygen.

91. The method according to claim 46 wherein no shielding gas is provided.

92. The method according to claim 46 wherein a gas is provided to the arc region, said gas comprising hydrogen and an inert gas.

93. The method according to claim 46 wherein a treatment agent is provided in the arc region.

94. The method according to claim 46 wherein a material is provided to the arc region, said material comprising one or more substances selected from the group consisting of nitrogen, ammonia, oxygen, organic nitrides, organic nitrates, diborane, boron halides, organic boron compounds, hydrocarbons, oxygen-containing hydrocarbons, or combinations thereof.

95. The method according to claim 46 wherein the arc region is provided with one or more substances from the group consisting of volatile metal compounds, metal halides, organometal complexes, metal hydrides, metal carbonyls and other metal bearing gases.

96. The method according to claim 46 wherein the arc site is provided with a treatment agent provided to the arc region as a liquid.

97. The method according to claim 46 wherein the arc site is provided with a treatment agent provided to the arc region as a solid.

98. The method according to either claim 96 or claim 97 wherein said agent is applied to said surface prior to treatment by said arc.

99. The method according to claim 46 wherein the means for providing said magnetically impelled arc comprise a channel-shaped magnetic core which is a permanent magnet.

100. The method according to claim 46 wherein the means for providing said arc include a channel-shaped magnetic core and electrical windings to produce electromagnetism at the core ends with the electrode projecting in the vicinity of said core ends.

101. The method according to claim 46 wherein said metallic object is provided as a catalyst support and a catalyst is applied thereto.

102. The method according to claim 46 wherein said metallic object is a prosthetic device and said surface is a tissue attaching surface.

103. The method according to claim 46 wherein said surface has an organic coating applied thereto.

104. The method according to claim 46 wherein said metallic object is for a heavy current electrical contact device and said surface is an electrical current contact surface for large electric currents.

105. The method according to claim 46 wherein said surface is a metal surface that is bonded to another metal surface.

106. The method according to claim 107 wherein said bonding is roll bonding.

107. The method according to claim 46 wherein said surface is bonded to another material which is metallic.

108. The method according to claim 46 wherein said surface is bonded to another material.

* * * * *